US011325409B2

(12) United States Patent
Ushigome et al.

(10) Patent No.: US 11,325,409 B2
(45) Date of Patent: *May 10, 2022

(54) EXPANSION DEVICE, THREE-DIMENSIONAL IMAGE FORMING SYSTEM, METHOD OF EXPANDING THERMALLY EXPANDABLE SHEET, AND COMPUTER READABLE STORAGE MEDIUM

(71) Applicant: CASIO COMPUTER CO., LTD., Tokyo (JP)

(72) Inventors: Youichi Ushigome, Akishima (JP); Minoru Saito, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 368 days.

This patent is subject to a terminal disclaimer.

(21) Appl. No.: 15/889,832

(22) Filed: Feb. 6, 2018

(65) Prior Publication Data

US 2018/0272777 A1    Sep. 27, 2018

(30) Foreign Application Priority Data

Mar. 24, 2017  (JP) .............................. JP2017-060040

(51) Int. Cl.
  *B41M 5/00* (2006.01)
  *B29C 37/00* (2006.01)
  (Continued)

(52) U.S. Cl.
  CPC ....... *B41M 5/0011* (2013.01); *B29C 35/0805* (2013.01); *B29C 35/16* (2013.01);
  (Continued)

(58) Field of Classification Search
  CPC .................... B31M 5/0011; B29C 35/0805
  See application file for complete search history.

(56) References Cited

U.S. PATENT DOCUMENTS 3,187,162 A     6/1965  Toku et al.
6,620,495 B1 *  9/2003  Kobayashi .............. B29C 44/00
                                                            428/158

(Continued)

FOREIGN PATENT DOCUMENTS

CN    104540675 A    4/2015
JP     56155786 A   12/1981

(Continued)

OTHER PUBLICATIONS

Machine Translation JP2015230858 (Year: 2015).*

(Continued)

*Primary Examiner* — Francisco W Tschen
*Assistant Examiner* — Wayne K. Swier
(74) *Attorney, Agent, or Firm* — Holtz, Holtz & Volek PC

(57) ABSTRACT

An expansion device, including: an installation unit in which a thermally expandable sheet is disposed; an irradiation unit configured to irradiate the thermally expandable sheet placed on the installation unit with light; and a control unit configured to perform processes described below, wherein after an expansion process to expand the thermally expandable sheet by irradiating the thermally expandable sheet placed on the installation unit with light by the irradiation unit, a cooling process to cool the thermally expandable sheet by a predetermined cooling unit while maintaining the state in which the thermally expandable sheet is placed on the installation unit.

14 Claims, 15 Drawing Sheets

(51) Int. Cl.

| | |
|---|---|
| *B41J 2/205* | (2006.01) |
| *B41J 2/21* | (2006.01) |
| *B32B 29/00* | (2006.01) |
| *B32B 5/02* | (2006.01) |
| *B32B 27/08* | (2006.01) |
| *B32B 27/10* | (2006.01) |
| *B32B 27/20* | (2006.01) |
| *B32B 27/36* | (2006.01) |
| *B32B 27/32* | (2006.01) |
| *B32B 27/30* | (2006.01) |
| *B29C 44/56* | (2006.01) |
| *B29C 35/16* | (2006.01) |
| *B29C 44/34* | (2006.01) |
| *B29C 44/02* | (2006.01) |
| *B29C 44/60* | (2006.01) |
| *B29C 35/08* | (2006.01) |
| *B29K 105/00* | (2006.01) |
| *B29K 711/12* | (2006.01) |
| *B29K 667/00* | (2006.01) |
| *B29K 31/00* | (2006.01) |
| *B29K 623/00* | (2006.01) |

(52) U.S. Cl.
CPC ............ *B29C 37/00* (2013.01); *B29C 44/022* (2013.01); *B29C 44/353* (2013.01); *B29C 44/56* (2013.01); *B29C 44/60* (2013.01); *B32B 5/02* (2013.01); *B32B 27/08* (2013.01); *B32B 27/10* (2013.01); *B32B 27/205* (2013.01); *B32B 27/306* (2013.01); *B32B 27/308* (2013.01); *B32B 27/32* (2013.01); *B32B 27/36* (2013.01); *B32B 29/002* (2013.01); *B41J 2/205* (2013.01); *B41J 2/21* (2013.01); *B41M 5/007* (2013.01); *B41M 5/0047* (2013.01); *B29C 44/3415* (2013.01); *B29C 2035/0822* (2013.01); *B29C 2035/1666* (2013.01); *B29C 2037/903* (2013.01); *B29C 2795/007* (2013.01); *B29K 2031/04* (2013.01); *B29K 2105/0076* (2013.01); *B29K 2105/256* (2013.01); *B29K 2623/12* (2013.01); *B29K 2667/003* (2013.01); *B29K 2667/006* (2013.01); *B29K 2711/12* (2013.01); *B32B 2250/03* (2013.01); *B32B 2255/00* (2013.01); *B32B 2307/30* (2013.01); *B32B 2307/75* (2013.01); *B32B 2554/00* (2013.01)

(56) References Cited

U.S. PATENT DOCUMENTS

| | | | |
|---|---|---|---|
| 9,731,494 | B2 | 8/2017 | Yamasaki |
| 10,016,965 | B2 | 7/2018 | Sugimoto |
| 2003/0235635 | A1 | 12/2003 | Fong et al. |
| 2005/0006820 | A1* | 1/2005 | Grajewski ............ B29C 48/914 264/405 |
| 2007/0187612 | A1* | 8/2007 | Inoue .................. B29C 65/7882 250/372 |
| 2010/0225017 | A1* | 9/2010 | Nakagawa ............ B29C 44/332 264/45.8 |
| 2013/0280498 | A1* | 10/2013 | Horiuchi .................. B44F 7/00 428/195.1 |
| 2015/0246518 | A1 | 9/2015 | Sugimoto |
| 2015/0375546 | A1 | 12/2015 | Yamasaki |
| 2016/0075083 | A1* | 3/2016 | Motoyanagi .......... B29C 64/188 264/41 |
| 2018/0272578 | A1 | 9/2018 | Ushigome et al. |
| 2018/0361634 | A1 | 12/2018 | Ushigome et al. |

FOREIGN PATENT DOCUMENTS

| | | | | |
|---|---|---|---|---|
| JP | 61072589 | A | | 4/1986 |
| JP | 64028660 | A | | 1/1989 |
| JP | 02267517 | A | * | 11/1990 |
| JP | 04166331 | A | | 6/1992 |
| JP | 07246767 | A | | 9/1995 |
| JP | 08118780 | A | * | 5/1996 |
| JP | H08118780 | A | | 5/1996 |
| JP | H09175099 | A | | 7/1997 |
| JP | 2001150812 | A | | 6/2001 |
| JP | 2001225543 | A | | 8/2001 |
| JP | 2013129144 | A | | 7/2013 |
| JP | 2013129144 | A | * | 7/2013 |
| JP | 2015230838 | A | | 12/2015 |
| JP | 2015230838 | A | * | 12/2015 |
| JP | 2016010955 | A | | 1/2016 |

OTHER PUBLICATIONS

Machine translation JPH02267517A (Year: 1990).*
Machine translation JPH08118780A (Year: 1996).*
Machine translation JP2013129144A (Year: 2013).*
Machine translation JP2015230838A (Year: 2015).*
Chinese Office Action dated Sep. 16, 2019 (and English translation thereof) issued in Chinese Application No. 201810161746.9.
Japanese Office Action dated Feb. 19, 2019 (and English translation thereof) issued in counterpart Japanese Application No. 2017-060040.
Japanese Office Action (and English language translation thereof) dated Jun. 2, 2020 issued in Japanese Application No. 2019-102207.

* cited by examiner

EXPANSION DEVICE, THREE-DIMENSIONAL IMAGE FORMING SYSTEM, METHOD OF EXPANDING THERMALLY EXPANDABLE SHEET, AND COMPUTER READABLE STORAGE MEDIUM

BACKGROUND OF THE INVENTION

1. Field of the Invention

The present invention relates to an expansion device, a three-dimensional image forming system, a method of expanding a thermally expandable sheet, and a computer readable storage medium.

2. Description of the Related Art

A technique for forming a three-dimensional image is known. For example, JP S64-28660 A and JP 2001-150812 A disclose methods of forming a three-dimensional image using a thermally expandable sheet. Specifically, in the methods disclosed in JP S64-28660 A and JP 2001-150812 A, a pattern is formed on a back surface of a thermally expandable sheet with a material having excellent light absorption characteristics, and the formed pattern is heated by being irradiated with light. As a result, the portion of the thermally expandable sheet on which the pattern is formed expands and swells to form a three-dimensional image.

A thermally expandable sheet may be deformed by heat when being expanded by heat. When the thermally expandable sheet is deformed, a three-dimensional image formed thereon is also distorted. Therefore, it becomes difficult to obtain a desired three-dimensional image. As a result, it is required to expand the thermally expandable sheet while suppressing deformation of the sheet.

The present invention is intended to solve the above problems, and an object of the present invention is to provide an expansion device capable of expanding a thermally expandable sheet while suppressing the deformation of the sheet, a three-dimensional image forming system, a method of expanding a thermally expandable sheet, and a program.

SUMMARY OF THE INVENTION

An expansion device, including: an installation unit in which a thermally expandable sheet is disposed; an irradiation unit configured to irradiate the thermally expandable sheet placed on the installation unit with light; and a control unit configured to perform processes described below, wherein after an expansion process to expand the thermally expandable sheet by irradiating the thermally expandable sheet placed on the installation unit with light by the irradiation unit, a cooling process to cool the thermally expandable sheet by a predetermined cooling unit while maintaining the state in which the thermally expandable sheet is placed on the installation unit.

An expansion method for a thermally expandable sheet, which is performed by an expansion device, the method including the steps of: expanding the thermally expandable sheet by causing the irradiation unit to emit light while moving the irradiation unit along a front or back surface of the thermally expandable sheet; and cooling the inside of the expansion device after the expanding step has been performed.

A non-transitory computer-readable recording medium storing a program executable by a computer for causing a computer controlling an expansion device to realize the following functions: moving the irradiation unit configured to emit light along a front or back surface of a thermally expandable sheet; cooling the inside of the expansion device; and performing a cooling process to cool the inside of the expansion device after the expansion process to expand the thermally expandable sheet has been performed by causing the irradiation unit to emit light while moving the irradiation unit.

DETAILED DESCRIPTION

Figure 1:
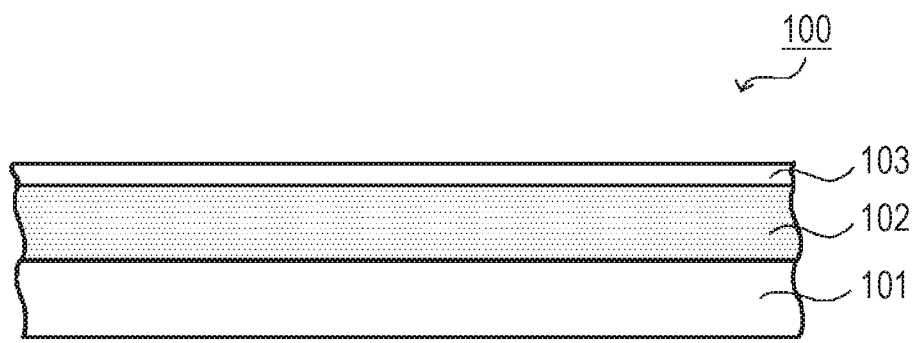
FIG. 1 is a cross-sectional view of a thermally expandable sheet according to a first embodiment of the present invention.

An embodiment of the present invention will be described below with reference to the accompanying drawings. In the drawings, the same or corresponding portions are denoted by the same reference numerals.

First Embodiment

<Thermally Expandable Sheet 100>

FIG. 1 illustrates a configuration of a thermally expandable sheet 100 for forming a three-dimensional image by a three-dimensional image forming system 1 according to the first embodiment. The thermally expandable sheet 100 is a medium on which a three-dimensional image is formed by expansion of a preselected portion. The three-dimensional image is a three-dimensional image formed by expanding a part of a two-dimensional sheet in the direction perpendicular to the sheet.

In addition, a "three-dimensional image" refers to as a molded object, and the molded object widely includes a general shape, such as a simple shape, a geometric shape, and characters. Furthermore, the molded object also includes an ornament formed as a result of decoration. The ornament refers to the sense of beauty through visual and/or tactile sense. "Three-dimensional image formation" includes not only forming the molded object but also decoration (ornament).

As illustrated in FIG. 1, the thermally expandable sheet 100 includes a base material 101, a thermally expandable layer 102, and an ink receiving layer 103 in this order. Note that FIG. 1 illustrates a cross section of the thermally expandable sheet 100 before a three-dimensional image is formed, that is, in a state where none of the parts are expanded.

The base material 101 is a sheet-like medium as a base of the thermally expandable sheet 100. The base material 101 is a support that supports the thermally expandable layer 102 and the ink receiving layer 103 and plays a role of maintaining the intensity of the thermally expandable sheet 100. As the base material 101, for example, a general printing paper can be used. Alternatively, the material of the base material 101 may be a synthetic paper, a cloth such as canvas, and a plastic film such as polypropylene, polyethylene terephthalate (PET), and polybutylene terephthalate (PBT) and is not particularly limited.

The thermally expandable layer 102 is laminated on the upper side of the base material 101 and expands when being heated to a temperature equal to or higher than a specified temperature. The thermally expandable layer 102 includes a binder and a thermally expandable agent dispersed in the binder. The binder is a thermoplastic resin such as a vinyl acetate type polymer, and an acryl type polymer. The thermally expandable agent is a thermally expandable microcapsule (micropowder) having a particle size of about 5 to 50 μm and containing a low boiling point vaporizing substance such as propane and butane in the outer shell of the thermoplastic resin. When the thermally expandable agent is heated to a temperature of, for example, 80 to 120° C., the contained substance is vaporized, and foams and distends due to a pressure of the substance. In this way, the thermally expandable layer 102 expands according to the amount of absorbed heat. The thermally expandable agent is also referred to as a foaming agent.

The ink receiving layer 103 is a layer laminated on the upper side of the thermally expandable layer 102 to absorb and receive the ink. The ink receiving layer 103 receives a printing ink used in an ink jet-type printer, a printing toner used in a laser-type printer, a ball pen or fountain pen ink, pencil graphite, and the like. The ink receiving layer 103 is formed of a suitable material for fixing these on a surface.

As the material of the ink receiving layer 103, for example, a general-purpose material used for an ink jet paper can be used.

Figure 2:
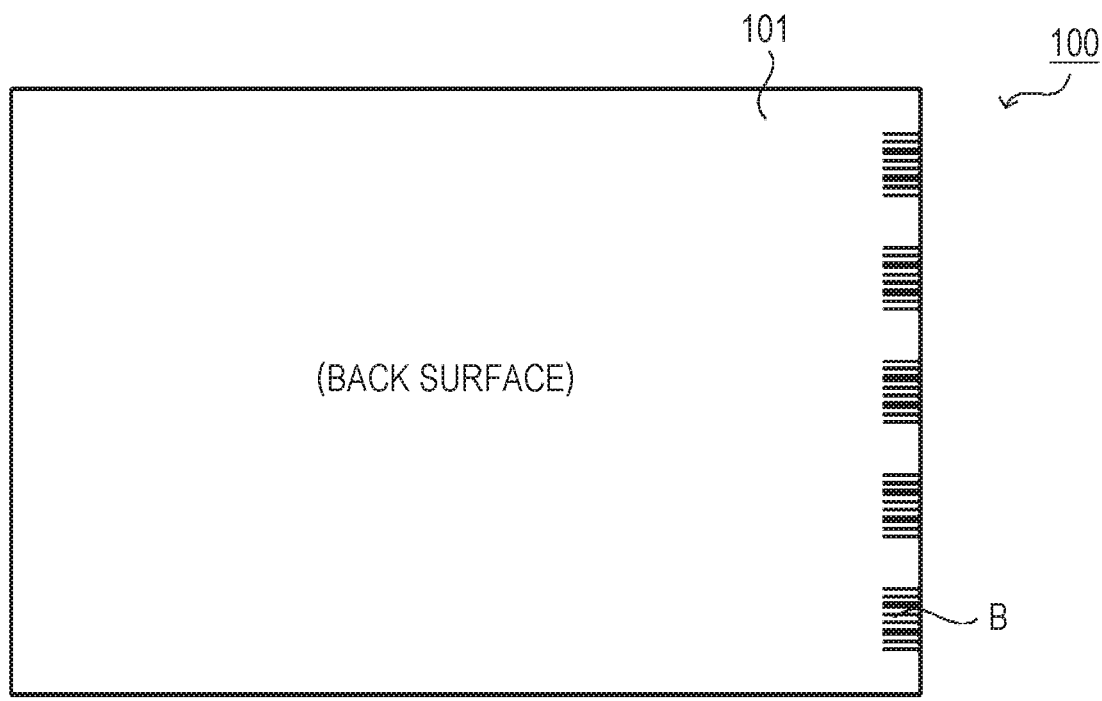
FIG. 2 is a view illustrating a back surface of the thermally expandable sheet illustrated in FIG. 1.

FIG. 2 illustrates the back surface of the thermally expandable sheet 100. The back surface of the thermally expandable sheet 100 is the surface of the thermally expandable sheet 100 on the side of the base material 101 and corresponds to the back surface of the base material 101. On the other hand, the front surface of the thermally expandable sheet 100 is the surface of the thermally expandable sheet 100 on the ink receiving layer 103 side and corresponds to the front surface of the ink receiving layer 103.

As illustrated in FIG. 2, a plurality of barcodes B is attached on the back surface of the thermally expandable sheet 100 along an edge of the back surface. The barcode B is an identifier for identifying the thermally expandable sheet 100 and is information indicating that the thermally expandable sheet 100 is a dedicated sheet for forming a three-dimensional image. The barcode B is read by the expansion device 50 of the three-dimensional image forming system 1 to be described later and is an identifier for determining whether or not to use the thermally expandable sheet 100 in the expansion device 50.

<Three-Dimensional Image Forming System 1>

Figure 3:
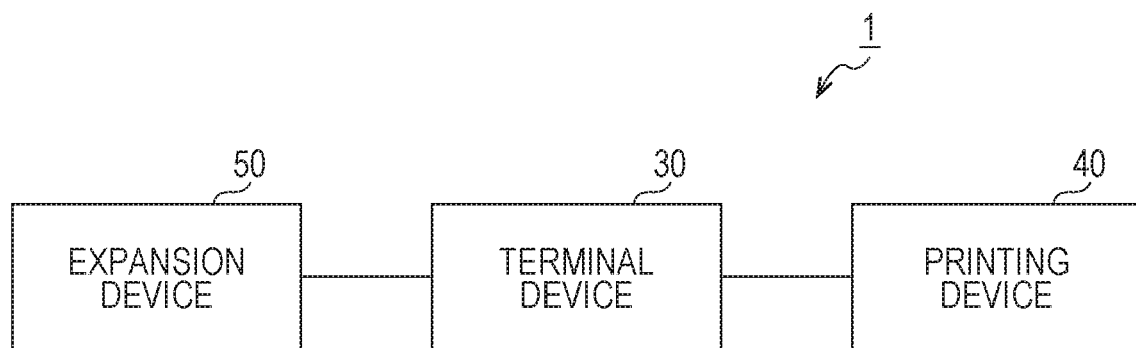
FIG. 3 is a diagram indicating a schematic configuration of a three-dimensional image forming system according to the first embodiment.

Next, with reference to FIG. 3, a three-dimensional image forming system 1 for forming a three-dimensional image (three-dimensional object or modeled object) on the thermally expandable sheet 100 will be described. As illustrated in FIG. 3, the three-dimensional image forming system (molding system) 1 includes a terminal device 30, a printing device 40, and an expansion device 50.

Figure 4:
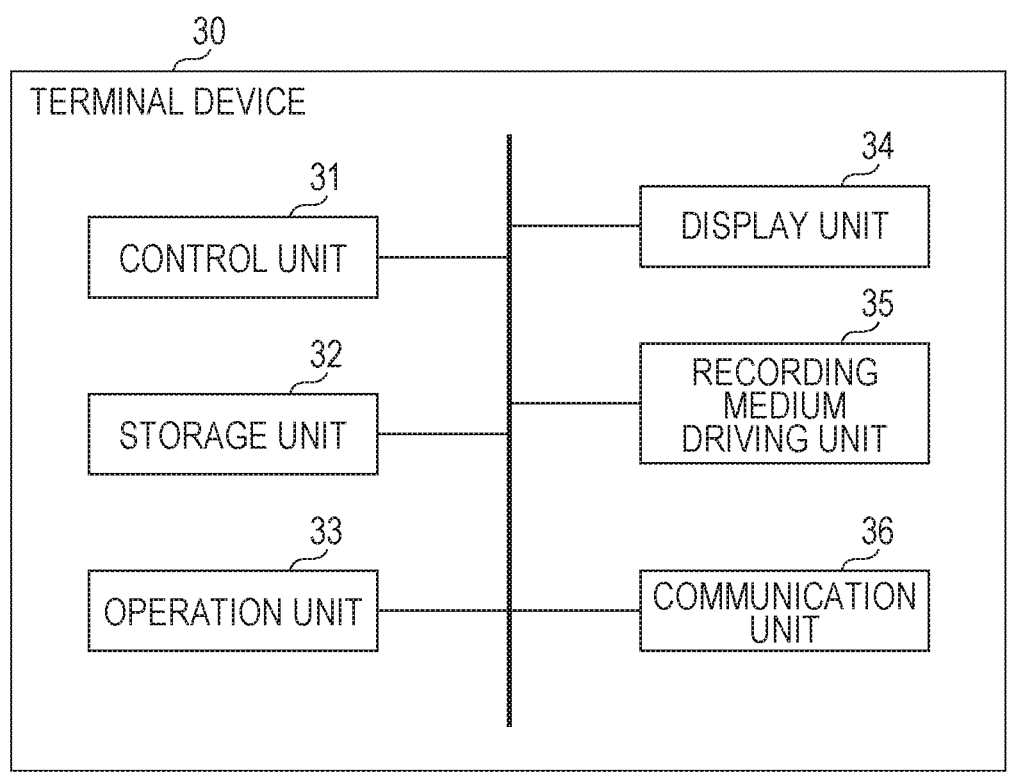
FIG. 4 is a block diagram indicating a configuration of a terminal device according to the first embodiment.

The terminal device 30 is an information processing device such as a personal computer, a smartphone, and a tablet and is a control unit that controls the printing device 40 and the expansion device 50. As illustrated in FIG. 4, the terminal device 30 includes a control unit 31, a storage unit 32, an operation unit 33, a display unit 34, a recording medium driving unit 35, and a communication unit 36. These units are connected by a bus for transmitting signals.

The control unit 31 includes a central processing unit (CPU), a read only memory (ROM), and a random access memory (RAM). In the control unit 31, the CPU reads a control program stored in the ROM and controls the entire operation of the terminal device 30 while using the RAM as a work memory.

The storage unit 32 is a nonvolatile memory such as a flash memory or a hard disc and stores a program or data to be performed by the control unit 31. More specifically, the storage unit 32 stores color image data, front surface foaming data, and back surface foaming data printed by the printing device 40.

The operation unit 33 includes input devices such as a keyboard, a mouse, a button, a touch pad, and a touch panel and accepts an operation from a user. By operating the operation unit 33, a user can input an operation of editing color image data, front surface foaming data, and back surface foaming data and an operation on the printing device 40 or the expansion device 50.

The display unit 34 includes a display device such as a liquid crystal display and an organic electro luminescence (EL) display and a display driving circuit for displaying an image on the display device. For example, the display unit 34 displays color image data, front surface foaming data, and back surface foaming data. Further, the display unit 34 displays information indicating the current state of the printing device 40 or the expansion device 50 as necessary.

The recording medium driving unit 35 reads a program or data recorded on a portable recording medium. The portable recording medium is a compact disc (CD)-ROM, a digital versatile disc (DVD)-ROM, a flash memory provided with a universal serial bus (USB) standard connector, or the like. For example, the recording medium driving unit 35 reads and acquires color image data, front surface foaming data, and back surface foaming data from a portable recording medium.

The communication unit 36 has an interface for communicating with an external device including the printing device 40 and the expansion device 50. The terminal device 30 is connected to the printing device 40 and the expansion device 50 via a wired line such as a flexible cable and a wired local area network (LAN), or a wireless line such as a wireless LAN and Bluetooth (registered trademark). Under the control of the control unit 31, the communication unit 36 communicates with the printing device 40 and the expansion device 50 according to at least one of the communication standards.

<Printing Device 40>

The printing device 40 is a printing unit that prints an image on a front or back surface of the thermally expandable sheet 100. The printing device 40 is an ink jet printer that prints an image by a method of forming ink droplets and directly spraying it onto a printing medium.

Figure 5:
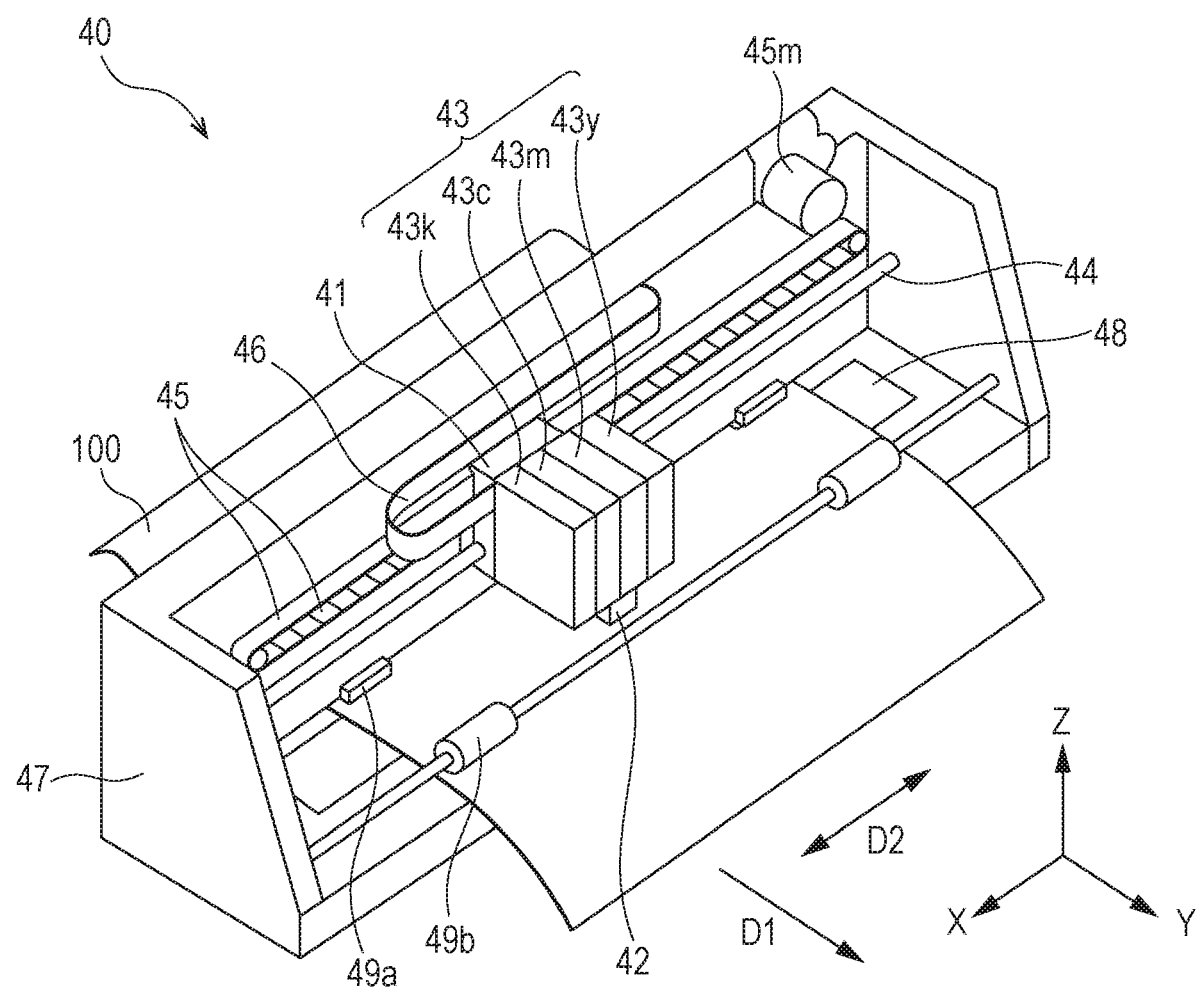
FIG. 5 is a perspective view illustrating a configuration of a printing device according to the first embodiment.

FIG. 5 illustrates a detailed configuration of the printing device 40. As illustrated in FIG. 5, the printing device 40 is provided with a carriage 41 capable of reciprocating in a main scanning direction D2 (X direction) orthogonal to a sub scanning direction D1 (Y direction) in which the thermally expandable sheet 100 is conveyed.

On the carriage 41, a print head 42 that performs printing and ink cartridges 43 (43k, 43c, 43m, and 43y) that store ink are attached. Color inks of black K, cyan C, magenta M, and yellow Y are contained in the ink cartridges 43k, 43c, 43m, and 43y, respectively. Each color ink is ejected from the corresponding nozzle of the print head 42.

The carriage 41 is slidably supported on a guide rail 44 and is sandwiched by a drive belt 45. When the drive belt 45 is driven by rotation of a motor 45m, the carriage 41 moves in the main scanning direction D2 together with the print head 42 and the ink cartridge 43.

At the bottom of a frame 47, a platen 48 is provided at a position facing the print head 42. The platen 48 extends in the main scanning direction D2 and constitutes a part of a conveying path of the thermally expandable sheet 100. A paper feed roller pair 49a (a lower roller is not illustrated) and a paper discharge roller pair 49b (a lower roller is not illustrated) are provided in the conveying path of the thermally expandable sheet 100. The paper feed roller pair 49a and the paper discharge roller pair 49b convey the thermally expandable sheet 100 supported by the platen 48 in the sub scanning direction D1.

The printing device 40 is connected to the terminal device 30 via a flexible communication cable 46. The terminal device 30 controls the print head 42, the motor 45m, the paper feed roller pair 49a, and the paper discharge roller pair 49b via the flexible communication cable 46. More specifically, the terminal device 30 causes the paper feed roller pair 49a and the paper discharge roller pair 49b to convey the thermally expandable sheet 100. Further, the terminal device 30 rotates the motor 45m to move the carriage 41 and conveys the print head 42 to an appropriate position in the main scanning direction D2.

The printing device 40 acquires image data from the terminal device 30 and performs printing based on the acquired image data. More specifically, the printing device 40 acquires color image data, front surface foaming data, and back surface foaming data as image data. The color image data is data indicating a color image to be printed on a front surface of the thermally expandable sheet 100. The printing device 40 ejects cyan C, magenta M, and yellow Y inks to the print head 42 toward the thermally expandable sheet 100 to print a color image.

On the other hand, the front surface foaming data is data indicating a portion to be foamed and expanded on the front surface of the thermally expandable sheet 100. The back surface foaming data is data indicating a portion to be foamed and expanded on the back surface of the thermally expandable sheet 100. The printing device 40 ejects black K ink containing carbon black toward the thermally expandable sheet 100 to print a grayscale image (grayscale pattern) by black color on the print head 42. The black ink containing carbon black is an example of a material that converts an electromagnetic wave into heat (for example, an electromagnetic wave thermal conversion material such as carbon), that is, a material that converts light into heat.

<Expansion Device 50>

The expansion device 50 is an expansion unit which irradiates a front or back surface of the thermally expandable sheet 100 with light (electromagnetic waves) to heat a grayscale image printed on the front or back surface of the thermally expandable sheet 100 and expand a portion of the thermally expandable sheet 100 on which the grayscale image is printed.

Figure 6:
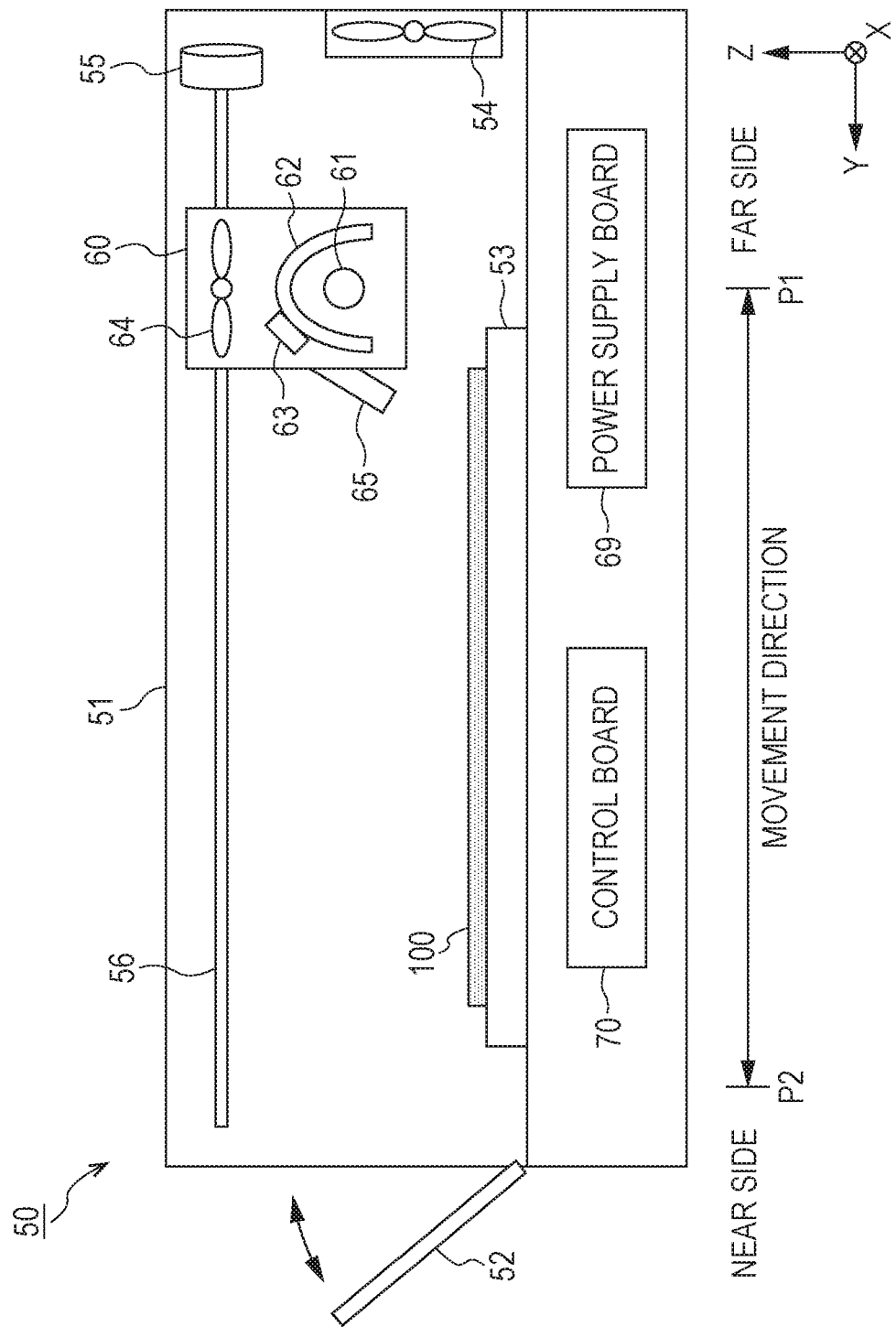
FIG. 6 is a cross-sectional view illustrating a configuration of an expansion device according to the first embodiment.

FIG. 6 schematically illustrates a configuration of the expansion device 50. In FIG. 6, the X direction corresponds to the width direction of the expansion device 50, the Y direction corresponds to the longitudinal direction of the expansion device 50, and the Z direction corresponds to the vertical direction. The X direction, the Y direction, and the Z direction are orthogonal to each other. As illustrated in FIG. 6, the expansion device 50 includes a housing 51, an insertion portion 52, a tray 53, a ventilation unit 54, a conveyance motor 55, a conveyance rail 56, an irradiation unit 60, a cooling unit 64, a barcode reader 65, a power supply board 69, and a control board 70.

The insertion portion 52 is provided with an openable and closeable door and is a mechanism for inserting the thermally expandable sheet 100, which is a target for forming a three-dimensional image, into the housing 51. A user opens the insertion portion 52, slides the tray 53, and pulls out the tray 53 to the near side, and then disposes the thermally expandable sheet 100 on the tray 53 with its front or back surface facing upward. At this time, a user disposes the thermally expandable sheet 100 on the tray 53 such that the end portion of the thermally expandable sheet 100 to which the barcode B is attached is positioned on the far side. Then, when the tray 53 on which the thermally expandable sheet 100 is disposed is returned to the inside of the housing 51, and the insertion portion 52 is closed, the thermally expandable sheet 100 is disposed at a position which can be irradiated with light by the irradiation unit 60.

Figure 7:
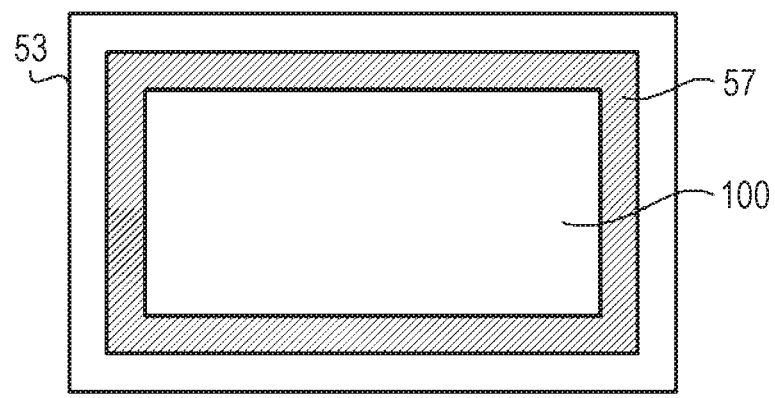
FIG. 7 is a view illustrating a thermally expandable sheet disposed on a tray according to the first embodiment.

The tray 53 is a mechanism for disposing the thermally expandable sheet 100 at an appropriate position in the housing 51. The tray 53 functions as an installation unit (installation portion) on which the thermally expandable sheet 100 is disposed. FIG. 7 illustrates the tray 53 on which the thermally expandable sheet 100 is disposed, as viewed from above (Z direction). As illustrated in FIG. 7, the tray 53 is provided with a rectangular frame-like fixing member 57 and fixed by pressing edges of the four sides of the disposed thermally expandable sheet 100 from above by the fixing member 57. In addition, the tray 53 is provided with a sensor for detecting the thermally expandable sheet 100, detects whether or not the thermally expandable sheet 100 is disposed, and detects the size of the thermally expandable sheet 100 when the thermally expandable sheet 100 is disposed.

The ventilation unit 54 is provided at an end portion on the far side in the expansion device 50 and functions as a ventilation unit for ventilating the inside of the expansion device 50. The ventilation unit 54 includes at least one exhaust fan and ventilates the inside of the housing 51 by discharging the air inside the housing 51 to the outside. The air in the housing 51 is supplied from the outside by the cooling unit 64 and discharged to the outside by the ventilation unit 54. The ventilation unit 54 circulates the air inside the housing 51 by discharging the air supplied from the outside by the cooling unit 64 to the outside.

The conveyance motor 55 is, for example, a stepping motor that operates in synchronization with pulse electric power and functions as a movement unit that moves the irradiation unit 60 along the front or back surface of the thermally expandable sheet 100. In the inside of the housing 51, a conveyance rail 56 is provided in the Y direction, that is, in a direction parallel to the front or back surface of the thermally expandable sheet 100. The irradiation unit 60 is attached to the conveyance rail 56 so as to be movable along the conveyance rail 56. The irradiation unit 60 reciprocates along the conveyance rail 56 while keeping a constant distance from the thermally expandable sheet 100 by using a driving force resulting from the rotation of the conveyance motor 55 as a power source.

More specifically, the irradiation unit 60 reciprocates between a first position P1 corresponding to the end portion on the far side of the thermally expandable sheet 100 and a second position P2 corresponding to the end portion on the near side of the thermally expandable sheet 100. The first position P1 is an initial position (home position) of the irradiation unit 60. The irradiation unit 60 stands by at the first position P1 when the expansion device 50 is not operating.

The first position P1 is a position on the side opposite to the side where the insertion portion 52 is provided in the housing 51, and the second position P2 is a position on the side where the insertion portion 52 is provided in the housing 51. In other words, the first position P1 is positioned farther from the end portion of the expansion device 50 on the side where the thermally expandable sheet 100 is inserted than the second position P2. Since the initial position of the irradiation unit 60 is provided on the side opposite to the insertion portion 52 in the housing 51, when a user inserts the thermally expandable sheet 100 into the housing 51, the user does not touch the irradiation unit 60. Therefore, a user can dispose the thermally expandable sheet 100 smoothly.

The irradiation unit 60 is a mechanism for emitting light. The irradiation unit 60 functions as an irradiation unit (irradiation unit) for irradiating the thermally expandable sheet 100 disposed on the tray 53 with light. As illustrated in FIG. 6, the irradiation unit 60 includes a lamp heater 61, a reflecting plate 62, a temperature sensor 63, a cooling unit 64, and a barcode reader 65.

The lamp heater 61 is provided with, for example, a halogen lamp, and irradiates the thermally expandable sheet 100 with light in a near infrared region (wavelength is 750 to 1400 nm), a visible light region (wavelength is 380 to 750 nm), or a mid-infrared region (wavelength is 1400 to 4000 nm). When the thermally expandable sheet 100 on which a grayscale image is printed by black ink containing carbon black is irradiated with light, the light is more efficiently converted into heat in the portion where the grayscale image is printed than the portion where the grayscale image is not printed. Therefore, the portion of the thermally expandable sheet 100 on which the grayscale image is printed is mainly heated and expands when a thermally expandable agent reaches the temperature at which expansion starts.

The reflecting plate 62 is disposed so as to cover the upper side of the lamp heater 61 and is a mechanism that reflects the light emitted from the lamp heater 61 toward the thermally expandable sheet 100. The temperature sensor 63 is a thermocouple, a thermistor, or the like and functions as a measuring unit that measures a temperature of the reflecting plate 62.

The cooling unit 64 is provided above the reflecting plate 62 and functions as a cooling unit for cooling the inside of the expansion device 50. The cooling unit 64 includes at least one air supply fan and cools the irradiation unit 60 by sending air from the outside of the expansion device 50 to the irradiation unit 60. More specifically, the cooling unit 64 sucks air outside the expansion device 50 from the air supply port provided on the upper side of the cooling unit 64 and sends the sucked air to the irradiation unit 60. The air sucked by the cooling unit 64 is supplied to the reflecting plate 62, and the reflecting plate 62 is air-cooled. Further, the air sucked by the cooling unit 64 is supplied to the inside of the expansion device 50 through the irradiation unit 60, and each unit in the housing 51 including the thermally expandable sheet 100 disposed on the tray 53 is cooled.

The barcode reader 65 functions as a reading unit for reading the barcode B attached to the back surface of the thermally expandable sheet 100. When the thermally expandable sheet 100 is inserted into the expansion device 50 with its front surface facing upward, the barcode reader 65 reads the barcode B attached to the back surface of the thermally expandable sheet 100 via a reflector (not illustrated). The reflector is disposed at the end portion on the far side of the tray 53 and is a reflecting mirror for enabling the barcode reader 65 to read the barcode B from the opposite side. On the other hand, when the thermally expandable sheet 100 is inserted into the expansion device 50 with the back surface facing upward, the barcode reader 65 directly reads the barcode B attached to the back surface of the thermally expandable sheet 100 without using the reflector.

The expansion device 50 determines whether or not a medium disposed on the tray 53 can be used in the expansion device 50, depending on whether or not the barcode B can be read by the barcode reader 65. If a medium that is not a dedicated sheet for forming a three-dimensional image is inserted into the expansion device 50, the expansion device 50 may not operate properly. Therefore, when the barcode reader 65 cannot read the barcode B, the expansion device 50 does not start a light irradiation process by the irradiation unit 60. As a result, malfunction of the expansion device 50 is reduced.

The power supply board 69 includes a power supply integrated circuit (IC) and the like and generates necessary power and supplies the power to each portion in the expansion device 50. For example, the ventilation unit 54, the conveyance motor 55, the lamp heater 61, and the cooling unit 64 operate by obtaining power from the power supply board 69.

Figure 8:
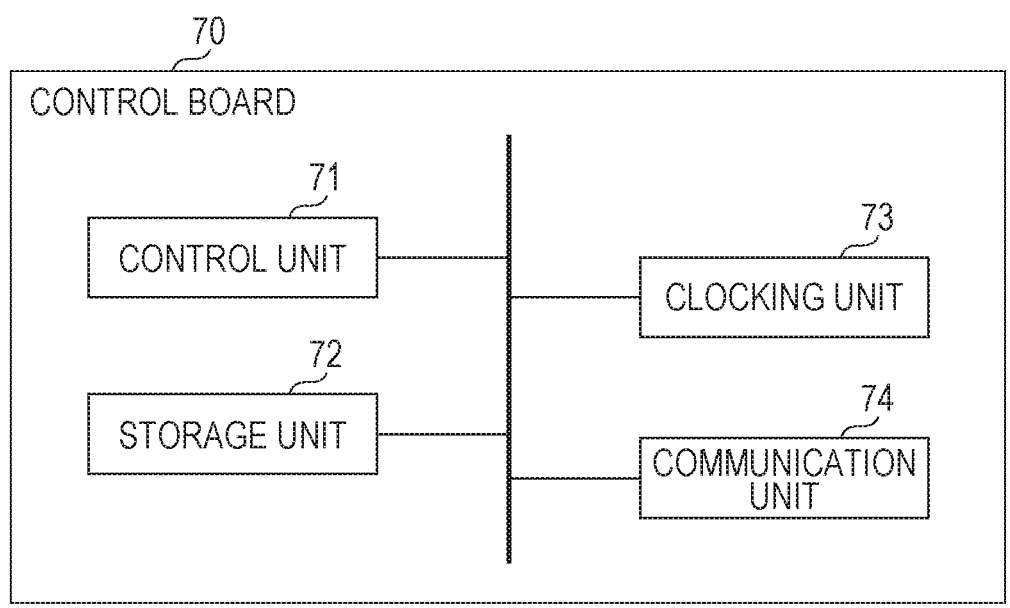
FIG. 8 is a block diagram indicating a configuration of a control board of the expansion device according to the first embodiment.

The control board 70 is provided on a board disposed under the housing 51 and controls operation of each unit of the expansion device 50. As illustrated in FIG. 8, the control board 70 includes a control unit 71, a storage unit 72, a clocking unit 73, and a communication unit 74.

The control unit 71 includes a CPU, a ROM, and a RAM and is connected to each unit of the expansion device 50 via a system bus that is a transmission path for transferring commands and data. The CPU is, for example, a microprocessor and is a central processing unit that performs various processes and operations. In the control unit 71, the CPU reads the control program stored in the ROM and controls the entire operation of the expansion device 50 while using the RAM as a work memory.

The storage unit 72 is a nonvolatile memory such as a flash memory or a hard disc. The storage unit 72 stores programs or data performed by the control unit 71 and data generated or acquired by the control unit 71 performing various processes. The clocking unit 73 includes a clocking device such as a real time clock (RTC) and clocks even while the power of the expansion device 50 is off.

The communication unit 74 has an interface for communicating with the terminal device 30. Under the control of the control unit 71, the communication unit 74 performs wired or wireless communication with the terminal device 30. For example, the communication unit 74 acquires, from the terminal device 30, a command to start a light irradiation process input from a user in the terminal device 30. Further, the communication unit 74 transmits information indicating the current state of the expansion device 50 to the terminal device 30.

The control unit 71 functions as a control unit that controls operations of the ventilation unit 54, the conveyance motor 55, the irradiation unit 60, and the cooling unit 64. More specifically, the control unit 71 performs an expansion process for expanding the thermally expandable sheet 100 and a cooling process for cooling the inside of the expansion device 50. The following will be described in order.

<Expansion Process>

The control unit 71 performs a process of expanding the thermally expandable sheet 100 by irradiating the thermally expandable sheet 100 disposed on the tray 53 with light by the irradiation unit 60. Specifically, the control unit 71 moves the irradiation unit 60 by the conveyance motor 55 while causing the irradiation unit 60 to emit light such that the thermally expandable sheet 100 is heated to or above a specified temperature to expand the thermally expandable sheet 100.

Figure 9:
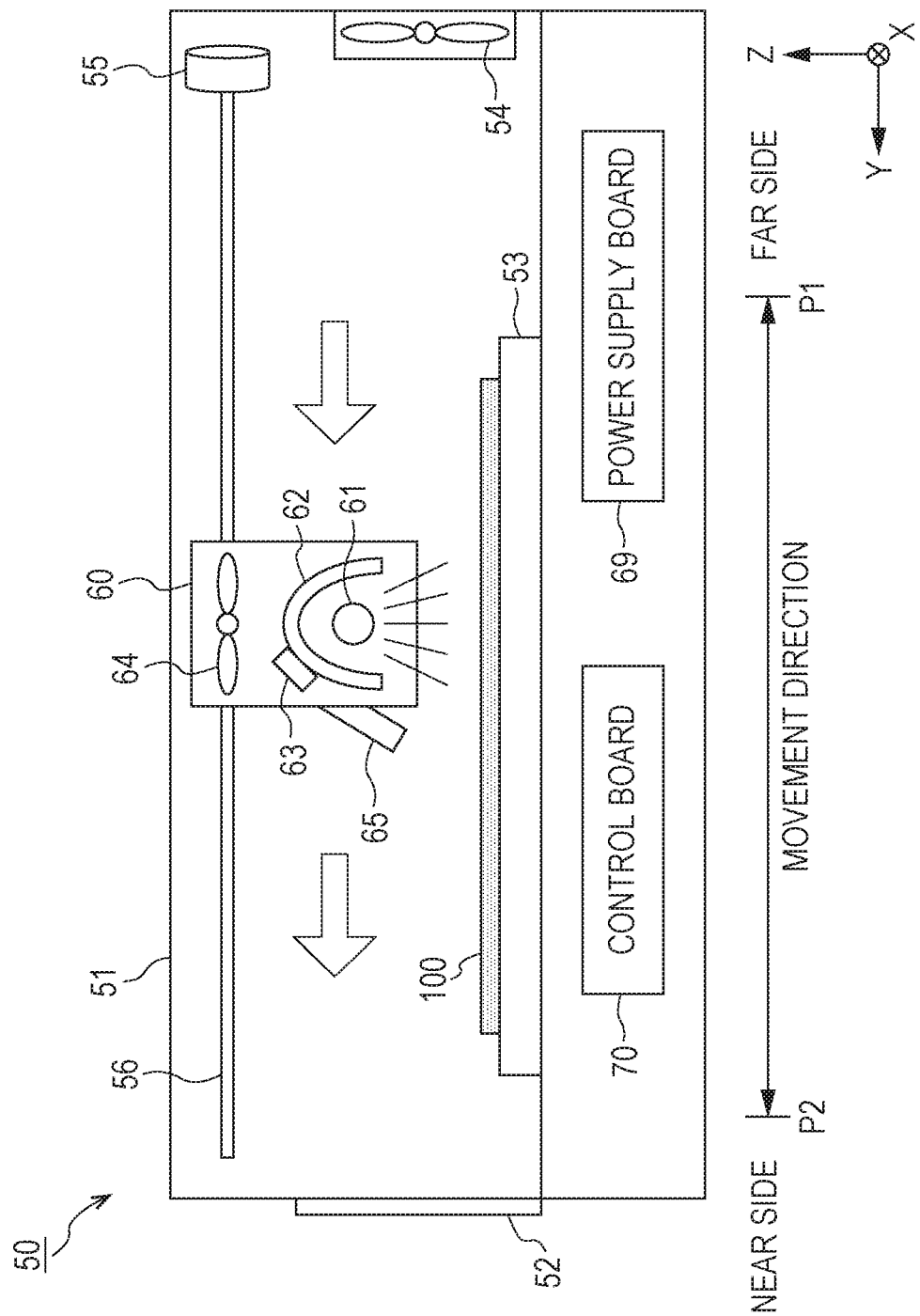
FIG. 9 is a view illustrating a state in which the expansion device performs an expansion process in the first embodiment.

FIG. 9 illustrates how the expansion device 50 performs the expansion process. In the expansion process, the control unit 71 supplies a power supply voltage to the irradiation unit 60 to light the lamp heater 61. At this time, the control unit 71 adjusts the power supply voltage to be supplied to the irradiation unit 60 and causes the irradiation unit 60 to emit light with a predetermined intensity. Then, the control unit 71 moves the irradiation unit 60 from the first position P1 toward the second position P2 at a predetermined speed by driving the conveyance motor 55 in the state in which the irradiation unit 60 is emitting light. In the expansion process, the ventilation unit 54 and the cooling unit 64 are not driven.

When light is emitted by the irradiation unit 60, a portion of the thermally expandable sheet 100 on which a grayscale image including carbon black is printed generates heat and expands when being heated to a specified temperature. The specified temperature is a temperature at which the thermally expandable agent included in the thermally expandable layer 102 starts to expand and is, for example, a temperature of about 80° C. to 120° C. The predetermined intensity and speed are preset such that the thermally expandable sheet 100 can be heated to a temperature equal to or higher than the specified temperature.

For example, the higher the intensity of the light emitted by the irradiation unit 60 is, the more the thermally expandable sheet 100 receives light and therefore the thermally expandable sheet 100 is further heated. Further, as the movement speed of the irradiation unit 60 is reduced, the irradiation time becomes long, and the thermally expandable sheet 100 is further heated. Therefore, by adjusting at least one of the intensity of the light emitted by the irradiation unit 60 and the movement speed of the irradiation unit 60, the amount of heat applied to each portion of the thermally expandable sheet 100 can be adjusted.

The predetermined intensity and the predetermined speed are set to values that can apply a sufficient amount of heat to the thermally expandable sheet 100 in consideration of such a relationship. The control unit 71 moves the irradiation unit 60 emitting light with a predetermined intensity at a predetermined speed to heat a portion of the thermally expandable sheet 100 on which a grayscale image is printed to a temperature equal to or higher than a specified temperature. As a result, the thermally expandable sheet 100 expands to a height corresponding to the density of black in the grayscale image.

<Cooling Process>

After performing the expansion process, the control unit 71 performs a cooling process to cool the thermally expandable sheet 100 by the cooling unit 64 while maintaining a state where the thermally expandable sheet 100 is disposed on the tray 53.

Due to the expansion process, the inside of the housing 51 including the thermally expandable sheet 100 contains a lot of heat. When the thermally expandable sheet 100 contains heat, its shape may be distorted and deformed in some cases. For example, the thermally expandable sheet 100 may be warped, that is, arched due to a difference in thermal characteristics of a plurality of layers included in the thermally expandable sheet 100. In order to suppress the warpage of the thermally expandable sheet 100, the control unit 71 cools the inside of the housing 51 and the thermally expandable sheet 100 by driving the cooling unit 64 after the expansion process has been performed.

Figure 10:
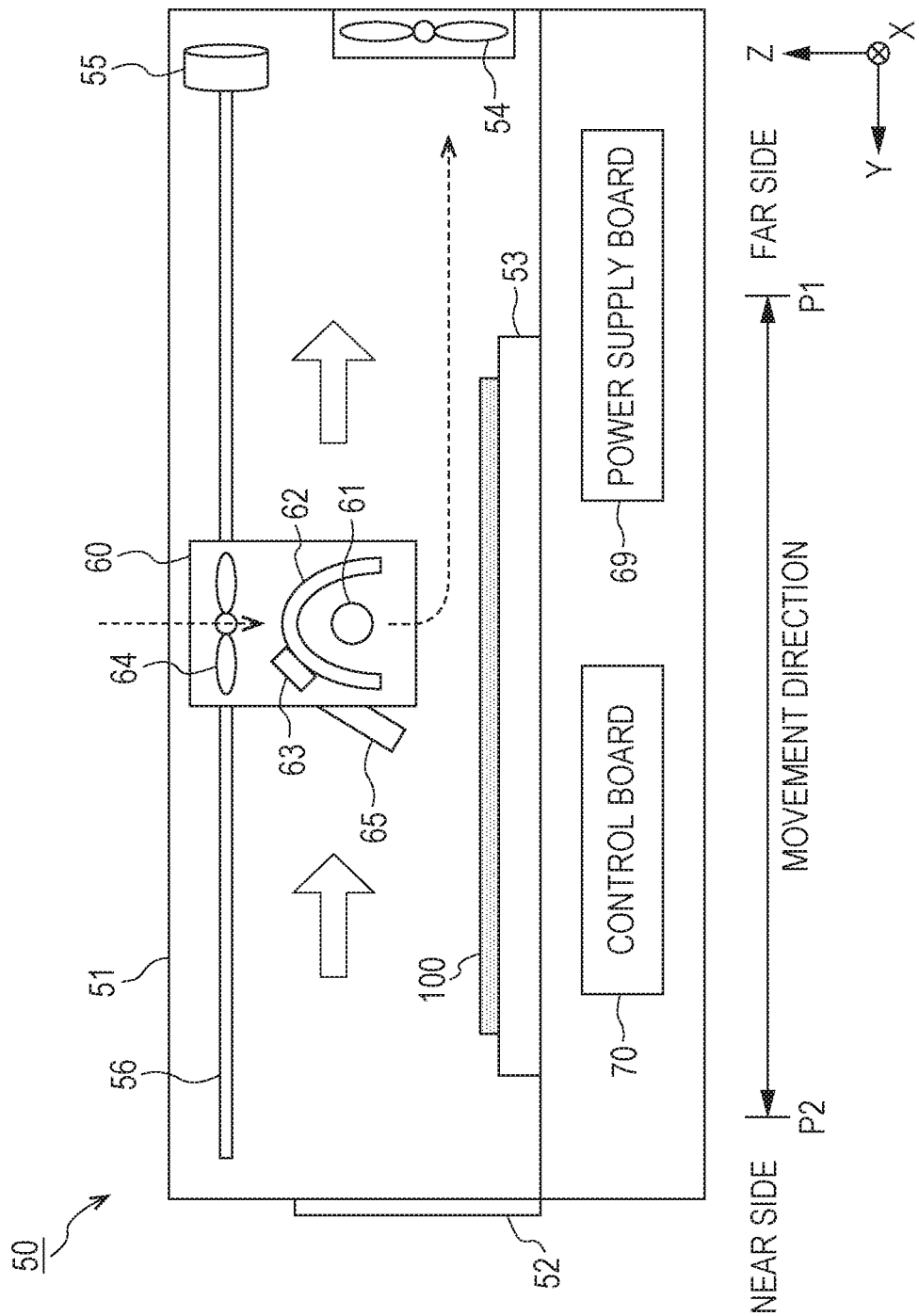
FIG. 10 is a view illustrating a state in which the expansion device performs a cooling process in the first embodiment.

FIG. 10 illustrates how the expansion device 50 performs the cooling process. Immediately after the expansion process, the irradiation unit 60 has reached the second position P2 which is positioned on the near side of the expansion device 50. In the cooling process, the control unit 71 causes the cooling unit 64 to cool the inside of the expansion device 50 while moving the irradiation unit 60 by the conveyance motor 55. More specifically, the control unit 71 stops supplying a power supply voltage to the irradiation unit 60 and turns off the lamp heater 61. Then, the control unit 71 supplies air outside the housing 51 into the housing 51 by driving the cooling unit 64. The control unit 71 moves the irradiation unit 60 from the second position P2 toward the first position P1 by driving the conveyance motor 55 while being cooled by the cooling unit 64.

At this time, the control unit 71 drives the ventilation unit 54 to discharge the air in the housing 51 to the outside. As the cooling unit 64 and the ventilation unit 54 are driven in this manner, as illustrated in FIG. 10, the air supplied from the outside by the cooling unit 64 flows to the far side of the expansion device 50 and discharged from the ventilation unit 54.

Since the cooling unit 64 is attached to the irradiation unit 60, it moves together with the irradiation unit 60. Therefore, by driving the cooling unit 64 while moving the irradiation unit 60, it is possible to widely supply the air outside the housing 51 into the housing 51 and to evenly cool the whole of the thermally expandable sheet 100. In this manner, the control unit 71 cools the thermally expandable sheet 100 after the expansion process has been performed, while moving the cooling unit 64 and in a state where edge portions of the four sides of the sheet are fixed to the tray 53. As a result, it is suppressed that the thermally expandable sheet 100 is warped after being removed from the tray 53.

<Three-Dimensional Image Forming Process>

Figure 11:
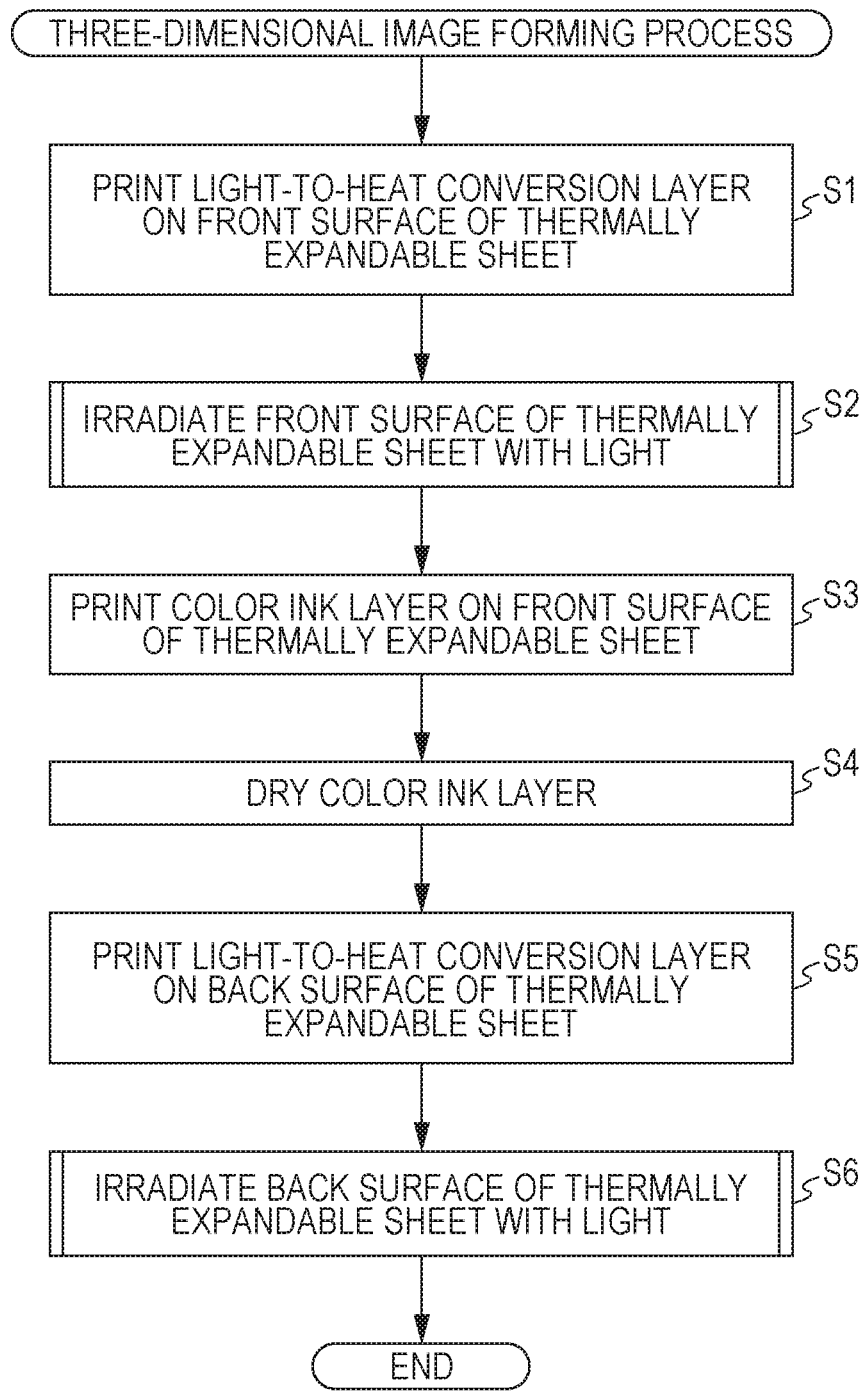
FIG. 11 is a flowchart indicating a flow of a three-dimensional image forming process according to the first embodiment.

The flow of a three-dimensional image forming process performed in the three-dimensional image forming system 1 configured as described above will be described with reference to the flowchart indicated in FIG. 11 and the cross sectional views of the thermally expandable sheet 100 illustrated in FIGS. 12A to 12E.

Figure 12A:
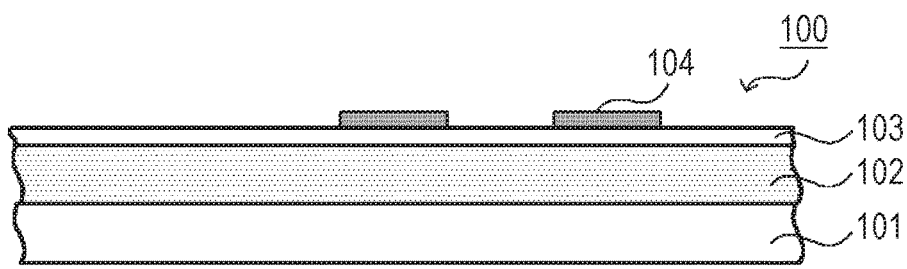
FIGS. 12A to 12E are views gradually illustrating formation of a three-dimensional image on the thermally expandable sheet illustrated in FIG. 1.

First, a user prepares the thermally expandable sheet 100 before the three-dimensional image is formed and specifies color image data, front surface foaming data, and back surface foaming data via the operation unit 33 of the terminal device 30. Then, the thermally expandable sheet 100 is inserted into the printing device 40 with its front surface facing upward. The printing device 40 prints a light-to-heat conversion layer 104 on the front surface of the inserted thermally expandable sheet 100 (step S1). The light-to-heat conversion layer 104 is a layer formed of a material that converts light into heat, specifically, black ink containing carbon black. The printing device 40 ejects black ink containing carbon black on the surface of the thermally expandable sheet 100 according to the specified front surface foaming data. As a result, as illustrated in FIG. 12A, the light-to-heat conversion layer 104 is formed on the ink receiving layer 103.

Figure 12B:
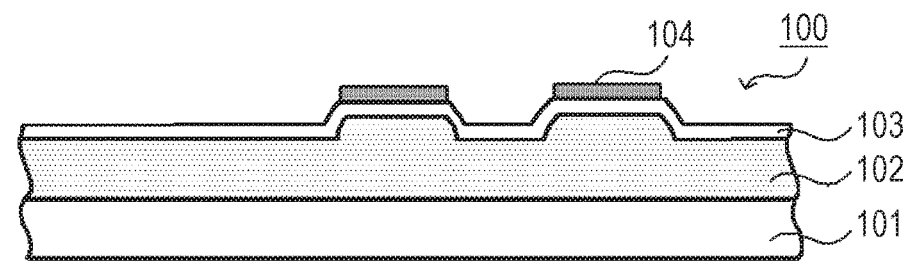

Secondly, a user inserts the thermally expandable sheet 100 on which the light-to-heat conversion layer 104 is printed into the expansion device 50 with its front surface facing upward. The expansion device 50 irradiates the front surface of the inserted thermally expandable sheet 100 with light by the irradiation unit 60 (step S2). The light-to-heat conversion layer 104 printed on the front surface of the thermally expandable sheet 100 generates heat by absorbing the emitted light. As a result, as illustrated in FIG. 12B, a portion of the thermally expandable sheet 100 on which the light-to-heat conversion layer 104 is printed swells and expands.

Figure 12C:
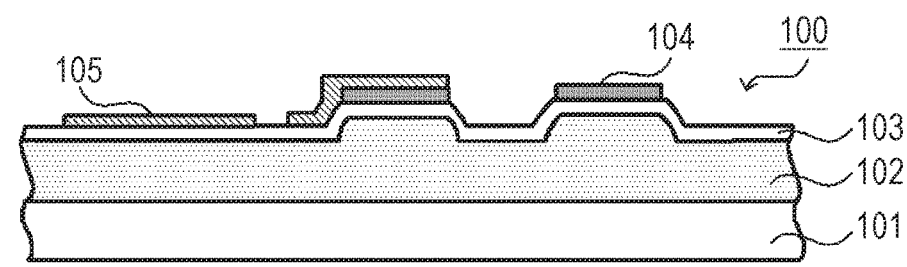

Thirdly, a user inserts the thermally expandable sheet 100 of which front surface has been heated and expanded, into the printing device 40 with its front surface facing upward. The printing device 40 prints a color ink layer 105 on the front surface of the inserted thermally expandable sheet 100 (step S3). Specifically, the printing device 40 ejects inks of cyan C, magenta M, and yellow Y onto the surface of the thermally expandable sheet 100 according to the specified color image data. As a result, as illustrated in FIG. 12C, the color ink layer 105 is formed on the ink receiving layer 103 and the light-to-heat conversion layer 104.

In the case of printing an image of black or gray color in the color ink layer 105, the printing device 40 forms the color ink layer 105 by mixing colors of inks of three colors of cyan C, magenta M, and yellow Y, or by further using a black ink that does not contain carbon black. This prevents the portion on which the color ink layer 105 is formed from being heated in the expansion device 50.

Fourthly, a user turns over the thermally expandable sheet 100 on which the color ink layer 105 is printed and inserts the thermally expandable sheet 100 into the expansion device 50 with its back surface facing upward. The expansion device 50 heats the thermally expandable sheet 100 from the back surface by irradiating the back surface of the inserted thermally expandable sheet 100 with light by the irradiation unit 60. As a result, the expansion device 50 volatilizes solvent contained in the color ink layer 105 to dry the color ink layer 105 (step S4). By drying the color ink layer 105, the thermally expandable sheet 100 can be easily expanded in a later step.

Figure 12D:
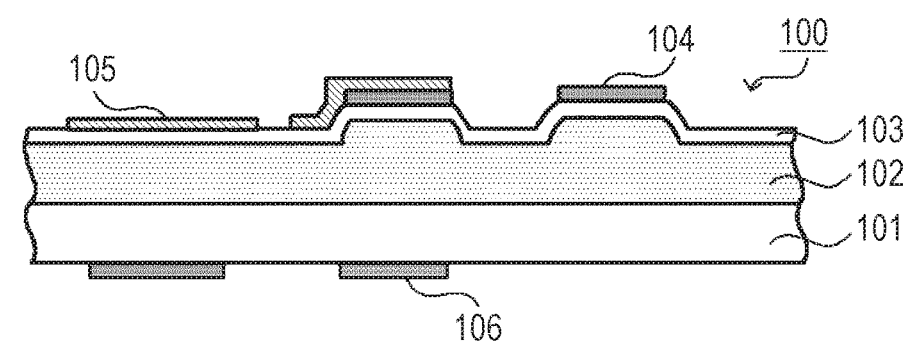

Fifthly, a user inserts the thermally expandable sheet 100 on which the color ink layer 105 is printed into the printing device 40 with its back surface facing upward. The printing device 40 prints the light-to-heat conversion layer 106 on the back surface of the inserted thermally expandable sheet 100 (step S5). As with the light-to-heat conversion layer 104 printed on the front surface of the thermally expandable sheet 100, the light-to-heat conversion layer 106 is a layer formed of a material that converts light into heat, specifically, black ink containing carbon black. The printing device 40 ejects black ink containing carbon black onto the back surface of the thermally expandable sheet 100 according to the specified back surface foaming data. As a result, as indicated in FIG. 12D, the light-to-heat conversion layer 106 is formed on the back surface of the base material 101.

Figure 12E:
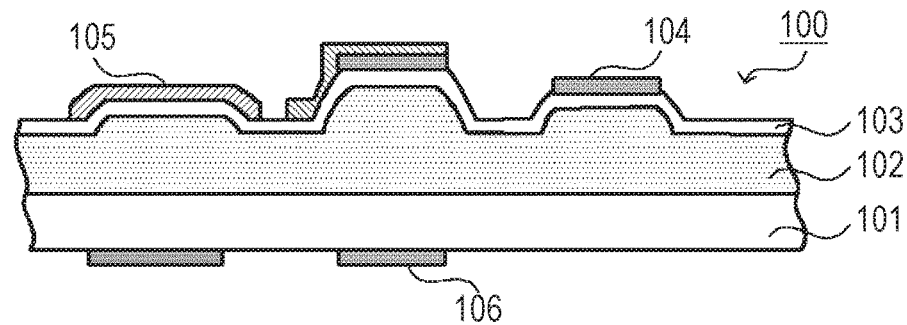

Sixthly, a user inserts the thermally expandable sheet 100 on which the light-to-heat conversion layer 106 is printed into the expansion device 50 with its back surface facing upward. The expansion device 50 irradiates the back surface of the inserted thermally expandable sheet 100 with light by the irradiation unit 60 (step S6). The light-to-heat conversion layer 106 printed on the back surface of the thermally expandable sheet 100 generates heat by absorbing the emitted light. As a result, as illustrated in FIG. 12E, the portion of the thermally expandable sheet 100 on which the light-to-heat conversion layer 106 is printed swells and expands.

In FIGS. 12A to 12E, for clarification, the light-to-heat conversion layer 104 and the color ink layer 105 are formed on the ink receiving layer 103. However, more precisely, the color ink and the black ink are absorbed inside the ink receiving layer 103, and therefore the light-to-heat conversion layer 104 and the color ink layer 105 are formed in the ink receiving layer 103.

As described above, a portion of the thermally expandable sheet 100 on which the light-to-heat conversion layers 104 and 106 are formed expands, and a color three-dimensional image is formed on the thermally expandable sheet 100. Since the light-to-heat conversion layers 104 and 106 are heated as its density increases, the light-heat converting layers 104 and 106 further expand. Therefore, three-dimensional images of various shapes can be obtained by adjusting the density of the light-to-heat conversion layers 104 and 106 according to the target height.

Either one of the process of heating the thermally expandable sheet 100 from the front surface and the process of heating from the back surface may be omitted. For example, when only the front surface of the thermally expandable sheet 100 is heated and expanded, steps S5 and S6 in FIG. 11 are omitted. On the other hand, in the case where only the back surface of the thermally expandable sheet 100 is heated and expanded, steps S1 and S2 in FIG. 11 are omitted. Further, printing of the color image in step S3 may be performed after the process of heating the thermally expandable sheet 100 from the back surface in step S6.

Further, when forming a monochrome three-dimensional image, the printing device 40 may print a monochrome image instead of a color image in step S3. In this case, a layer of black ink is formed on the ink receiving layer 103 and the light-to-heat conversion layer 104 instead of the color ink layer 105.

Figure 13:
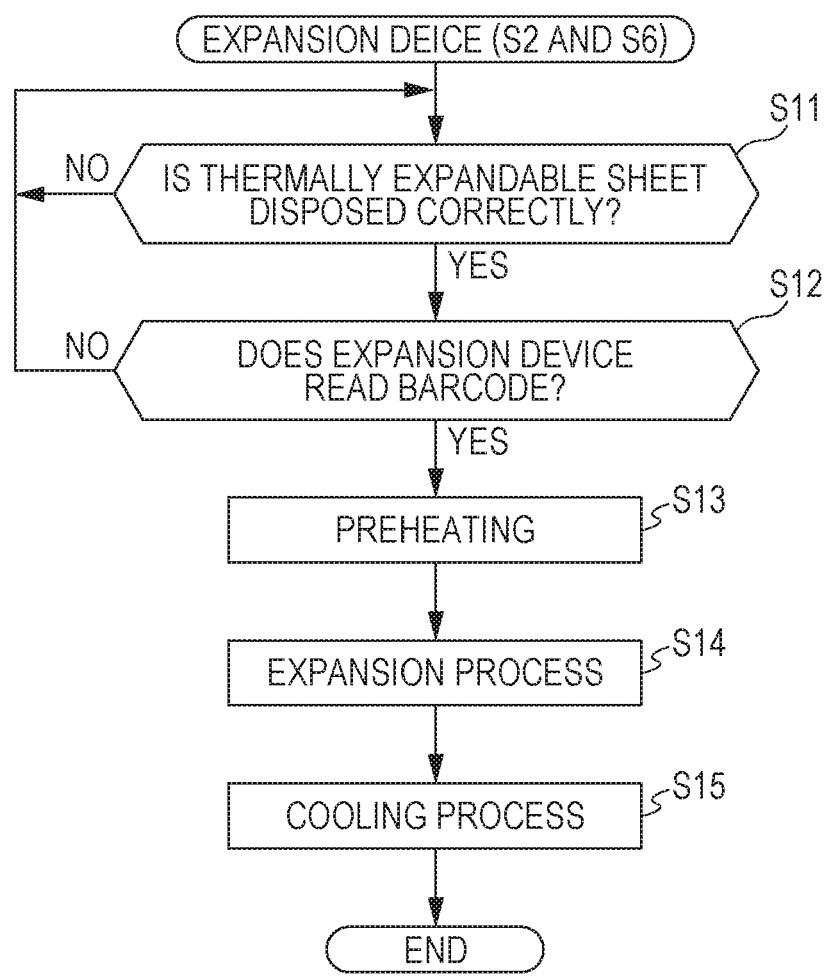
FIG. 13 is a flowchart indicating a flow of the processes performed by the expansion device according to the first embodiment.

Next, with reference to the flowchart indicated in FIG. 13, the details of the process performed by the expansion device 50 in steps S2 and S6 will be described.

In step S2, a user places the thermally expandable sheet 100 on the tray 53 with its front surface facing upward and inserts the sheet into the expansion device 50. In step S6, a user places the thermally expandable sheet 100 on the tray 53 with its back surface facing upward and inserts the sheet into the expansion device 50. Thereafter, a user operates the operation unit 33 of the terminal device 30 and inputs a command to expand the thermally expandable sheet 100. When the control unit 71 of the expansion device 50 receives the command input from the user from the terminal device 30 in this way, the control unit 71 starts the process indicated in FIG. 13.

When the process is started, the control unit 71 determines whether or not the thermally expandable sheet 100 is properly disposed (step S11). More specifically, the control unit 71 determines whether or not the thermally expandable sheet 100 is disposed at a proper position on the tray 53 via a sensor provided in the tray 53.

When the thermally expandable sheet 100 is not disposed properly (step S11; NO), the control unit 71 stops the process in step S11. At this time, by issuing a warning, the control unit 71 notifies a user that the thermally expandable sheet 100 is not properly disposed and requests the user to properly dispose the thermally expandable sheet 100.

If the thermally expandable sheet 100 is disposed properly (step S11; YES), the control unit 71 determines whether or not the barcode B attached to the back surface of the thermally expandable sheet 100 can be read via the barcode reader 65 (step S12). The barcode B is an identifier for determining whether or not to use the thermally expandable sheet 100 and is provided at the end portion on the far side of the thermally expandable sheet 100 disposed on the tray 53.

When it is not possible to read the barcode B attached to the thermally expandable sheet 100 (step S12; NO), the control unit 71 returns the process to step S11. At this time, the control unit 71 notifies a user that the thermally expandable sheet 100 cannot be used and requests the user to replace the thermally expandable sheet 100 with an appropriate sheet.

When the barcode B can be read (step S12; YES), the control unit 71 performs preheating (step S13). The preheating is a process of preliminarily heating the irradiation unit 60 before the expansion device 50 starts a main operation. More specifically, the control unit 71 turns on the lamp heater 61, heats the irradiation unit 60 to a predetermined temperature, and then drives the cooling unit 64 to cool the irradiation unit 60.

When the preheating is performed, the control unit 71 performs an expansion process (step S14). More specifically, the control unit 71 turns on the lamp heater 61 and causes the irradiation unit 60 to emit light with predetermined intensity. Then, as illustrated in FIG. 9, the control unit 71 drives the conveyance motor 55 to move the irradiation unit 60 emitting the light with the predetermined intensity from the first position P1 toward the second position P2 at a predetermined speed. As a result, the control unit 71 heats a portion of the thermally expandable sheet 100 on which a grayscale image is printed to a temperature equal to or higher than a specified temperature to expand the thermally expandable sheet 100. Step S14 is an example of the expansion step.

After performing the expansion process, the control unit 71 performs the cooling process (step S15). More specifically, the control unit 71 turns off the lamp heater 61, causes the irradiation unit 60 to stop emitting light, and drives the cooling unit 64. Then, as indicated in FIG. 10, the control unit 71 drives the conveyance motor 55 while cooling by the cooling unit 64 to move the irradiation unit 60 from the second position P2 toward the first position P1. As a result, the control unit 71 cools the thermally expandable sheet 100 heated in the expansion process and suppresses warpage of the thermally expandable sheet 100. Step S15 is an example of the cooling step.

As described above, the expansion device 50 according to the first embodiment expands the thermally expandable sheet 100 by causing the irradiation unit 60 to emit light while moving the irradiation unit 60 along the thermally expandable sheet 100. After the expansion process of the thermally expandable sheet 100 is performed, the cooling process is performed in the expansion device 50. By performing the cooling process after the expansion process, since the thermally expandable sheet 100 heated in the expansion process can be cooled, it is possible to suppress warpage and deformation of the thermally expandable sheet 100.

In particular, the expansion device 50 according to the first embodiment heats the thermally expandable sheet 100 by moving the irradiation unit 60, not by moving the thermally expandable sheet 100. Therefore, it is possible to cool the thermally expandable sheet 100 by a simple method of emitting light while moving the irradiation unit 60 after the expansion process.

Further, the expansion device 50 according to the first embodiment performs the expansion process when the irradiation unit 60 is moved from the first position P1 toward the second position P2 and performs the cooling process when the irradiation unit 60 is moved from the second position P2 toward the first position P1. As described above, since the expansion device 50 performs the expansion process and the cooling process while the irradiation unit 60 reciprocates once between the first position P1 and the second position P2, the expansion device 50 can efficiently performs the expansion process and the cooling process.

Second Embodiment

Next, a second embodiment of the present invention will be described. In the second embodiment, description of the same configuration as that of the first embodiment will be omitted.

In the first embodiment, the expansion device 50 has performed the expansion process for expanding the thermally expandable sheet 100 and the cooling process for cooling the inside of the expansion device 50. In contrast, in the second embodiment, in addition to the expansion process and the cooling process, the expansion device 50 performs a drying process for drying the thermally expandable sheet 100 and a ventilation process for ventilating the inside of the expansion device 50.

Figure 14:
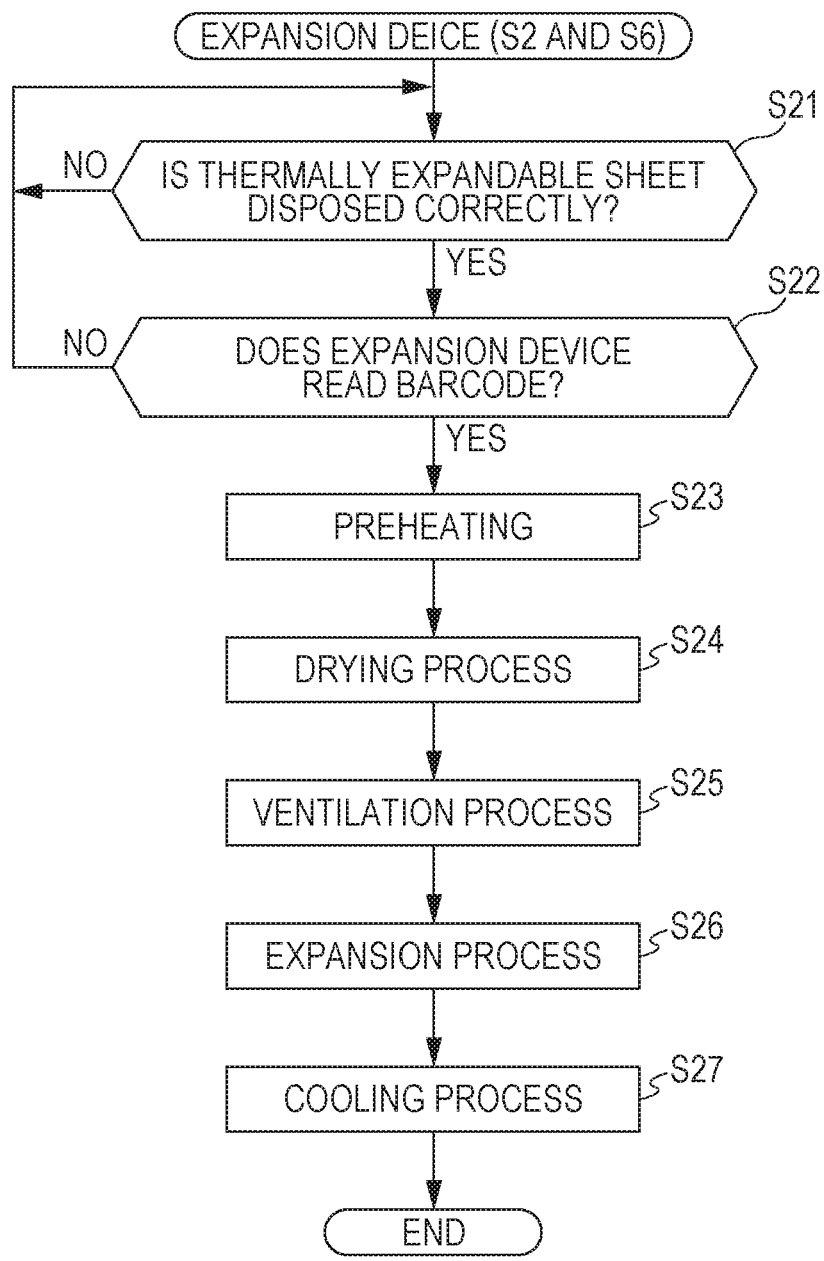
FIG. 14 is a flowchart indicating a flow of processes performed by an expansion device according to a second embodiment the present invention.

FIG. 14 indicates a flow of the processes performed by the expansion device 50 according to the second embodiment. Similarly to FIG. 13, the processes indicated in FIG. 14 are started upon receipt of a command to expand the thermally expandable sheet 100 from a user via a terminal device 30 in a state in which the thermally expandable sheet 100 is inserted into the expansion device 50 with its front or back surface facing upward. Since the processes in steps S21 to S23 in FIG. 14 are the same as the processes in steps S11 to S13 in FIG. 13, the description thereof will be omitted.

<Drying Process>

When preheating is performed in step S23, the control unit 71 performs a drying process (step S24). In the drying process, a control unit 71 causes an irradiation unit 60 to emit light while moving the irradiation unit 60 by a conveyance motor 55 such that the thermally expandable sheet 100 is maintained at a temperature lower than the specified temperature to dry the thermally expandable sheet 100. Step S24 is an example of a drying step.

The thermally expandable sheet 100 may contain moisture, for example, when the ink applied in the printing device 40 is not sufficiently dried, or due to factors such as surrounding environment. When the thermally expandable sheet 100 contains a large amount of moisture, the thermally expandable sheet 100 is not heated to a temperature needed to expand the thermally expandable sheet 100, and it becomes difficult to expand the thermally expandable sheet 100 to a desired height. To suppress such a situation and to expand the thermally expandable sheet 100 with high accuracy, the expansion device 50 performs the drying process of the thermally expandable sheet 100 before performing the expansion process of the thermally expandable sheet 100.

Figure 15:
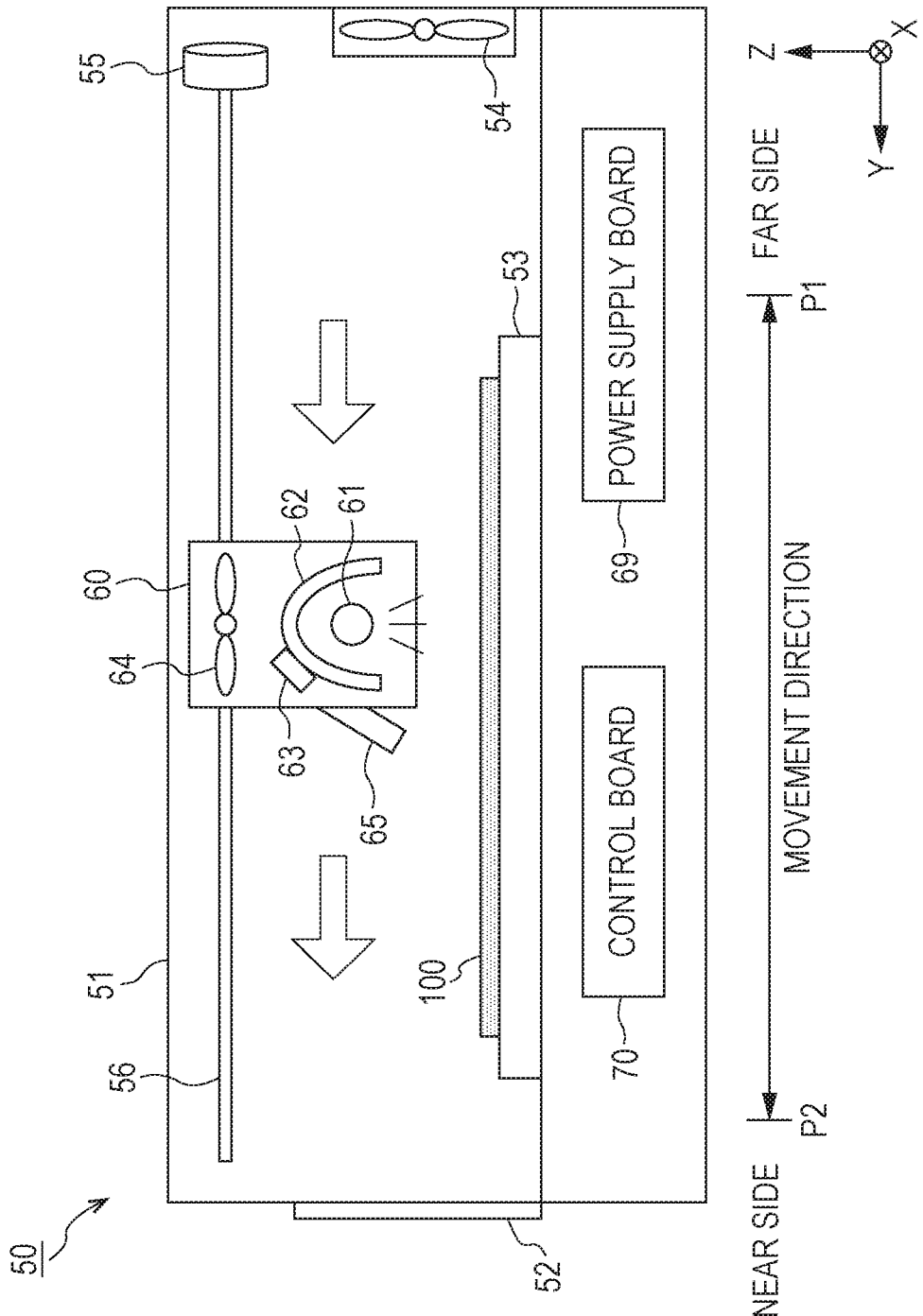
FIG. 15 is a view illustrating a state in which the expansion device performs a drying process in the second embodiment.

FIG. 15 illustrates how the expansion device 50 performs the drying process. In the drying process, the control unit 71 supplies a power supply voltage to the irradiation unit 60 to turn on a lamp heater 61. At this time, the control unit 71 causes the irradiation unit 60 to emit light with the first intensity by adjusting a power supply voltage to be supplied to the irradiation unit 60. Then, the control unit 71 moves the irradiation unit 60 from the first position P1 toward the second position P2 at the first speed by driving the conveyance motor 55 in the state in which the irradiation unit 60 is emitting light. In the drying process, a ventilation unit 54 and a cooling unit 64 are not driven.

When light is emitted by the irradiation unit 60, a portion of the thermally expandable sheet 100 on which a grayscale image including carbon black is printed generates heat. In the drying process, the control unit 71 dries the thermally expandable sheet 100 without expanding the sheet. Therefore, the first intensity and the first speed are preset such that the thermally expandable sheet 100 can be maintained below a specified temperature at which a thermally expandable agent starts to expand, in other words, such that the thermally expandable sheet 100 is not heated to a temperature equal to or higher than a specified temperature.

For example, the higher the intensity of the light emitted by the irradiation unit 60 is, the more the thermally expandable sheet 100 receives a large amount of light, and therefore the thermally expandable sheet 100 is further heated. Further, as the movement speed of the irradiation unit 60 is reduced, the irradiation time becomes long, and the thermally expandable sheet 100 is further heated. Therefore, by adjusting at least one of the intensity of the light emitted by the irradiation unit 60 and the movement speed of the irradiation unit 60, the amount of heat applied to each portion of the thermally expandable sheet 100 can be adjusted.

In consideration of such a relationship, the first intensity and the first speed are set to values that can apply to the thermally expandable sheet 100 an amount of heat that does not expand the sheet. The control unit 71 maintains the thermally expandable sheet 100 at a temperature lower than the specified temperature by moving the irradiation unit 60 emitting light with the first intensity at the first speed. As a result, moisture contained in the thermally expandable sheet 100 is evaporated and dried.

<Ventilation Process>

After performing the drying process, the control unit 71 performs a ventilation process (step S25). In the ventilation process, the control unit 71 causes the ventilation unit 54 to ventilate the inside of the expansion device 50 while moving the irradiation unit 60 by the conveyance motor 55. Step S25 is an example of a ventilation step.

By the drying process, the air in the housing 51 contains moisture evaporated from the thermally expandable sheet 100. To remove moisture in the housing 51, the control unit 71 ventilates the inside of the housing 51 by driving the ventilation unit 54 after performing the drying process.

Figure 16:
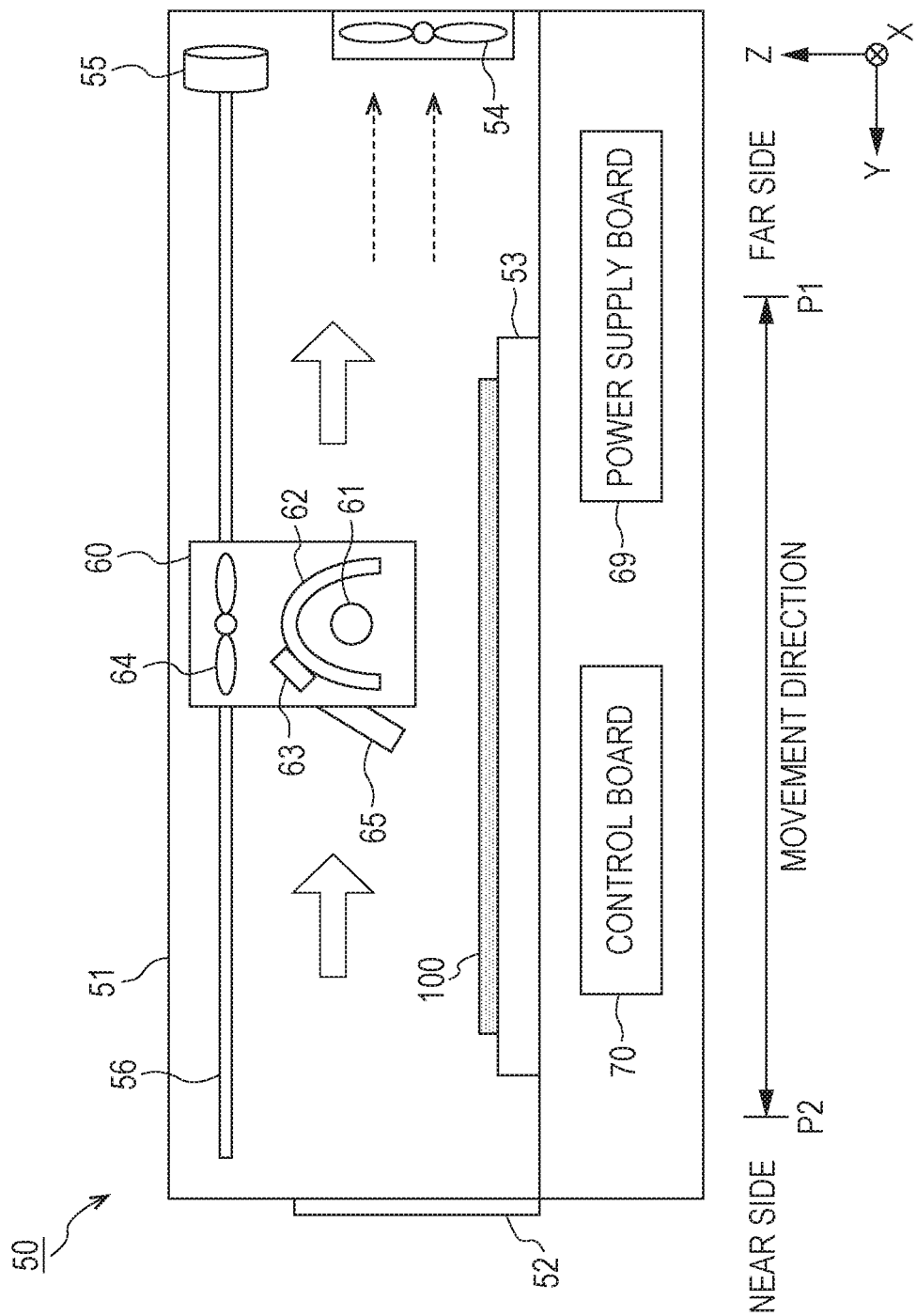
FIG. 16 is a view illustrating a state in which the expansion device performs a ventilation process in the second embodiment.

FIG. 16 indicates how the expansion device 50 performs the ventilation process. In the ventilation process, the ventilation unit 54 ventilates the inside of the expansion device 50 by sending the air inside the expansion device 50 in the direction in which the irradiation unit 60 moves in a return path after the irradiation unit 60 moves along the thermally expandable sheet 100 in the drying process and discharging the air outside the expansion device 50. More specifically, immediately after the drying process, the irradiation unit 60 reaches the second position P2 which is the near side of the expansion device 50. In the ventilation process, the control unit 71 stops supplying the power supply voltage to the irradiation unit 60 and turns off the lamp heater 61. Then, the control unit 71 drives the ventilation unit 54 to exhaust the air inside the housing 51 to the outside. The control unit 71 moves the irradiation unit 60 from the second position P2 toward the first position P1 by driving the conveyance motor 55 in a state in which the ventilation unit 54 is ventilating.

In the drying process, since the irradiation unit 60 moves from the first position P1 toward the second position P2, moisture evaporated from the thermally expandable sheet 100 is contained more in the farther side than the irradiation unit 60. Since the ventilation unit 54 is disposed at an end portion on the far side of the expansion device 50, it is possible to efficiently remove moisture contained on the farther side than the irradiation unit 60. In particular, by moving the irradiation unit 60 from the near side to the far side, it is possible to send the air inside the housing 51 toward the far side, such that the air from the ventilation unit 54 disposed at the end portion on the far side can be efficiently ventilated.

<Expansion Process>

After performing the ventilation process, the control unit 71 performs an expansion process (step S26). The expansion process in the second embodiment is the same as the expansion process in the first embodiment. Step S26 is an example of an expansion step.

More specifically, the control unit 71 turns on the lamp heater 61 and causes the irradiation unit 60 to emit light with the second intensity. Then, as illustrated in FIG. 9, the control unit 71 drives the conveyance motor 55 to move the irradiation unit 60 emitting light with the second intensity from the first position P1 toward the second position P2 at a second speed. As a result, the control unit 71 heats a portion of the thermally expandable sheet 100 on which a grayscale image is printed to a temperature equal to or higher than a specified temperature to expand the thermally expandable sheet 100.

Here, since the thermally expandable sheet 100 is irradiated with a greater amount of light than in the drying process, the second intensity is set to a value higher than the first intensity in the drying process. As an example, the second intensity is set to the intensity about two to three times the first intensity. Further, the second intensity is set to a value higher than the first intensity, or alternatively, the second speed is set to a value lower than the first speed in the drying process. As an example, the second speed is set to a speed of about half to one third of the first speed. Since the second speed is set to a value lower than the first speed, the moving time of the irradiation unit 60 is longer than that in the drying process. Therefore, it is possible to irradiate the thermally expandable sheet 100 with more light.

<Cooling Process>

After performing the expansion process, the control unit 71 performs the cooling process (step S27). The cooling process in the second embodiment is the same as the cooling process in the first embodiment. Step S27 is an example of a cooling step.

More specifically, the control unit 71 turns off the lamp heater 61, causes the irradiation unit 60 to stop emitting light, and drives the cooling unit 64. Then, as illustrated in FIG. 10, the control unit 71 drives the conveyance motor 55 while cooling by the cooling unit 64 to move the irradiation unit 60 from the second position P2 toward the first position P1. As a result, the control unit 71 cools the thermally expandable sheet 100 heated in the expansion process and suppresses warpage of the thermally expandable sheet 100.

As described above, the expansion device 50 according to the second embodiment performs the drying process and the ventilation process before performing the expansion process of the thermally expandable sheet 100. By performing the drying process before the expansion process, it is possible to prevent the thermally expandable sheet 100 from being difficult to heat in the expansion process. Therefore, the thermally expandable sheet 100 can be expanded with high accuracy. Further, by performing the ventilation process after the drying process, moisture evaporated from the thermally expandable sheet 100 by the drying process can be removed from the inside of the expansion device 50.

In addition, the expansion device 50 according to the second embodiment performs the drying process when the irradiation unit 60 is moved from the first position P1 toward the second position P2, performs the ventilation process when the irradiation unit 60 is moved from the second position P2 toward the first position P1, performs the expansion process when the irradiation unit 60 is moved from the first position P1 toward the second position P2, and performs the cooling process when the irradiation unit 60 is moved from the second position P2 toward the first position P1. As described above, the expansion device 50 performs the drying process, the ventilation process, the expansion process, and the cooling process while the irradiation unit 60 reciprocates twice between the first position P1 and the second position P2. Therefore, these four processes can be efficiently performed.

(Variation)

Although the embodiments of the present invention have been described above, the above-described embodiments are merely an example, and the application range of the present invention is not limited thereto. That is, the embodiments of the present invention can be applied in various ways, and all embodiments fall within the scope of the present invention.

For example, in the above embodiment, the control unit 71 performs each of the drying process, the ventilation process, the expansion process, and the cooling process when the irradiation unit 60 is moved from the first position P1 toward the second position P2 or when the irradiation unit 60 is moved from the second position P2 toward the first position P1. However, in the present invention, the control unit 71 is not limited to performing these processes only in an outward path or a return path, and if necessary, to perform each process, the irradiation unit 60 may be reciprocated once or a plurality of times between the first position P1 and the second position P2.

Further, the number of times or order of performing the drying process, the ventilation process, the expansion process, and the cooling process is not limited to those described in the above embodiments. For example, the control unit 71 may perform the ventilation process after the expansion process, or omit the drying process or the ventilation process.

In the above embodiments, the control unit 71 performs the cooling process when the irradiation unit 60 is returned from the second position P2 to the first position P1 by the conveyance motor 55. However, in the present invention, as long as the control unit 71 can cool the inside of the expansion device 50 including the thermally expandable sheet 100 after the expansion process, the control unit 71 may perform the cooling process when the irradiation unit 60 is not moving.

In the above-described embodiments, the cooling unit 64 is attached to the irradiation unit 60 and moved together with the irradiation unit 60. However, in the present invention, the cooling unit 64 may be provided at a position other than the irradiation unit 60 as long as it can cool the inside of the expansion device 50 including the thermally expandable sheet 100. Further, in the above-described embodiments, the ventilation unit 54 is provided at the end portion on the far side of the expansion device 50. However, in the present invention, the ventilation unit 54 may be provided in other position as long as it can ventilate the inside of the expansion device 50.

In the above-described embodiment, the initial position (home position) of the irradiation unit 60 has been on the far side of the expansion device 50. However, the initial position of the irradiation unit 60 may be on the near side of the expansion device 50. When the initial position of the irradiation unit 60 is on the near side of the expansion device 50, it can be explained in the same way as in the above embodiment by reversing the positional relationship between the first position P1 and the second position P2.

Figure 17A:
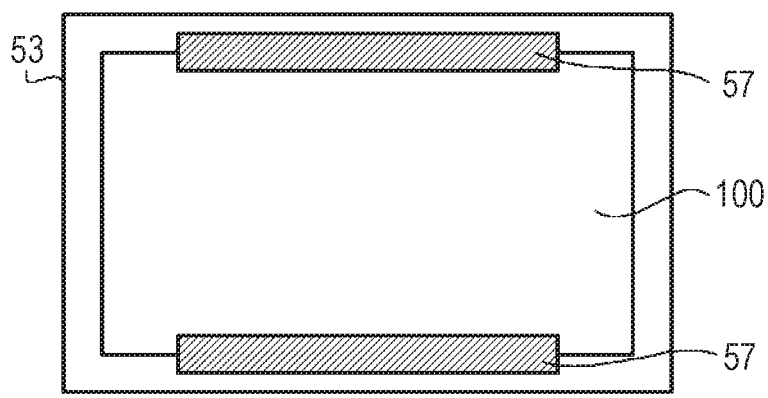
FIGS. 17A to 17D are views illustrating thermally expandable sheets disposed on a tray by being pressed on two facing sides in a variation of the present invention.
Figure 17B:
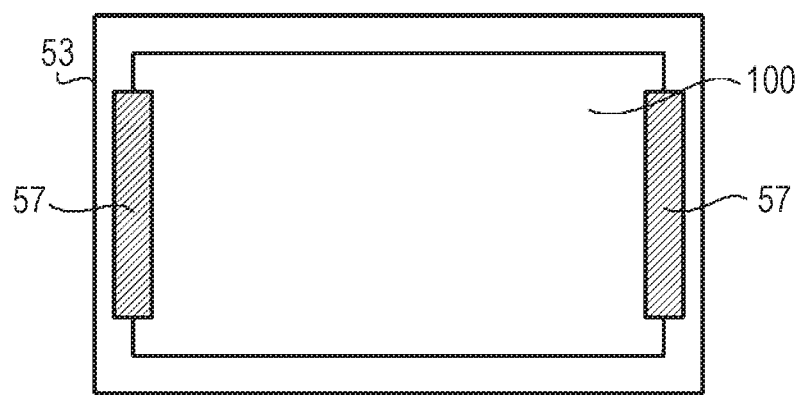
Figure 17C:
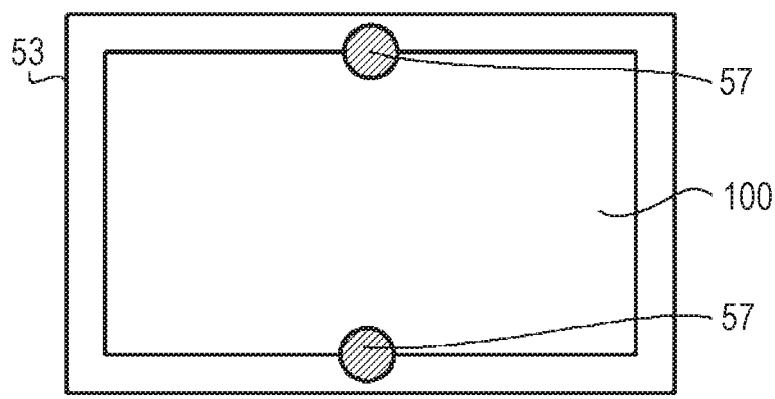
Figure 17D:
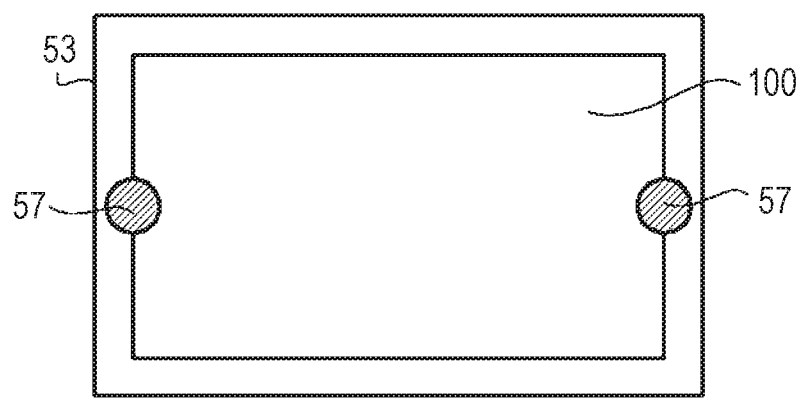

In the above-described embodiment, as illustrated in FIG. 7, the tray 53 is disposed so as to press the four sides of the thermally expandable sheet 100 by the fixing member 57. However, in the present invention, as long as the thermally expandable sheet 100 can be fixed, it is not necessary for all of the four sides to be pressed down by the tray 53. For example, as indicated in FIGS. 17A and 17B, the tray 53 may be disposed so as to press two opposed sides by two rod-shaped fixing members 57. Alternatively, as illustrated in FIGS. 17C and 17D, the tray 53 may be provided so as to press two opposing sides by two point-like fixing members 57. As described above, the tray 53 may be disposed to press at least two sides facing each other out of the four sides of the thermally expandable sheet 100.

Figure 18A:
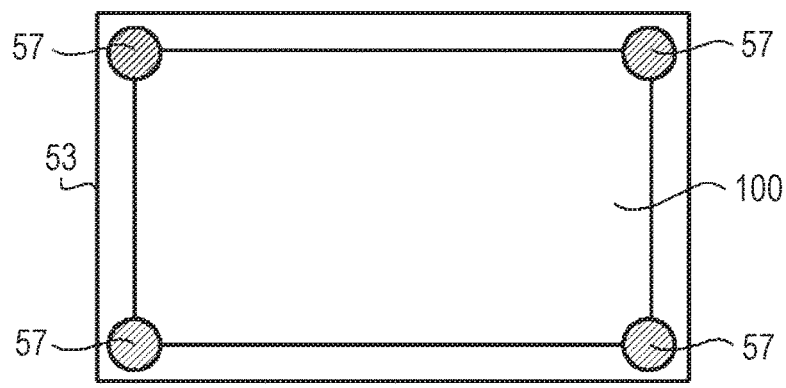
FIGS. 18A to 18C are views illustrating thermally expandable sheets disposed on a tray by being pressed at least two facing corners in the variation of the present invention.
Figure 18B:
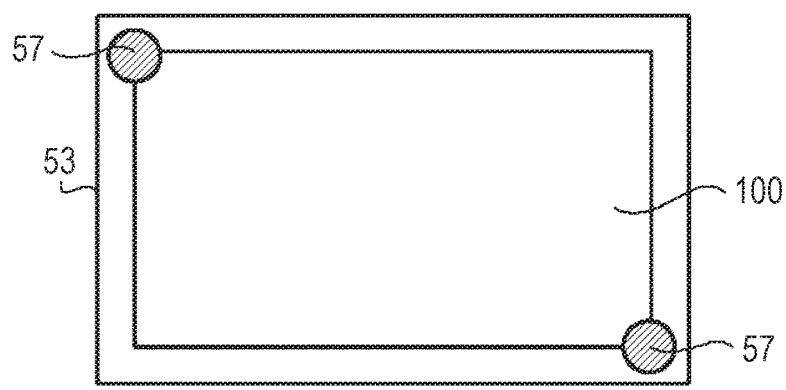
Figure 18C:
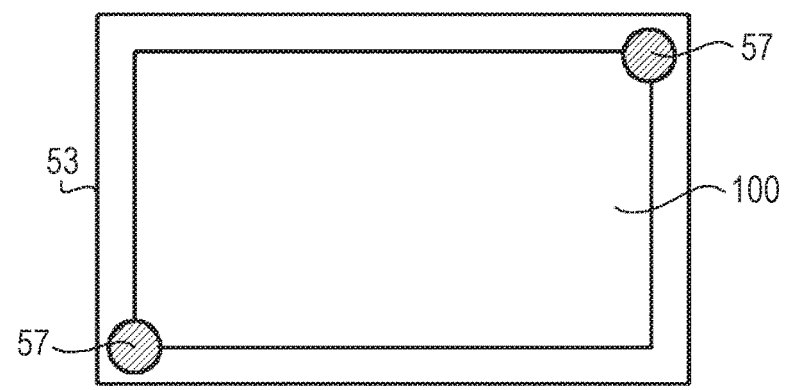

Further, as illustrated in FIG. 18A, the tray 53 may be disposed to press the four corners of the thermally expandable sheet 100 with four point-like fixing members 57. Alternatively, as indicated in FIGS. 18B and 18C, the tray 53 may be disposed to press two corners facing each other out of four corners of the thermally expandable sheet 100 by the two point-like fixing members 57. The two corners facing each other are two corners connected by a diagonal line in the rectangular thermally expandable sheet 100. In this manner, the tray 53 may be disposed to press at least two corners facing each other out of the four corners of the thermally expandable sheet 100.

In the above-described embodiments, the thermally expandable sheet 100 includes the base material 101, the thermally expandable layer 102, and the ink receiving layer 103. However, in the present invention, the configuration of the thermally expandable sheet 100 is not limited thereto. For example, the thermally expandable sheet 100 may not include the ink receiving layer 103. Alternatively, the thermally expandable sheet 100 may be provided with a layer of any other material between the base material 101 and the thermally expandable layer 102 or between the thermally expandable layer 102 and the ink receiving layer 103.

In the above-described embodiments, the terminal device 30, the printing device 40, and the expansion device 50 are independent devices. However, in the present invention, at least two of the terminal device 30, the printing device 40, and the expansion device 50 may be integrated.

The printing method of the printing device 40 is not limited to an ink jet method. For example, the printing device 40 is a laser-type printer, and an image may be printed with a toner and a developer. In addition, the light-to-heat conversion layers 104 and 106 may be formed of a material other than black ink containing carbon black as long as it is a material that easily converts light into heat. In this case, the light-to-heat conversion layers 104 and 106 may be formed by a unit other than the printing device 40.

In the above-described embodiment, the control unit 71 of the expansion device 50 includes a CPU and performs a drying process for drying the thermally expandable sheet 100, a ventilation process for ventilating the inside of the expansion device 50, an expansion process for expanding the thermally expandable sheet 100, and a cooling process for cooling the inside of the expansion device 50. However, in the expansion device 50 according to the present invention, the control unit 71 may include dedicated hardware such as an application specific integrated circuit (ASIC), a field-programmable gate array (FPGA), or various control circuits, instead of CPU, and the dedicated hardware may perform each of the drying process, the ventilation process, the expansion process, and the cooling process. In this case, each process may be performed by individual hardware, or all the processes may be performed by single hardware. In addition, some of the processes may be performed by dedicated hardware, and others may be performed by software or firmware.

Note that, in addition to providing the expansion device with the configuration for realizing the functions according to the present invention, each functional configuration by the expansion device 50 exemplified in the above-described embodiments can be realized in a computer controlling the expansion device by applying a program. That is, a program for realizing each functional configuration by the expansion device 50 exemplified in the above embodiments can be applied such that a CPU or the like for controlling an existing information processing device or the like can execute the program.

A method of applying such a program is arbitrary. The program can be stored in a computer readable recording medium such as a flexible disc, a compact disc (CD)-ROM, a digital versatile disc (DVD)-ROM, or a memory card. Furthermore, the program may be superimposed on a carrier wave and applied via a communication medium such as the Internet. For example, a program may be distributed by posing on a bulletin board (BBS: Bulletin Board System) on a communication network. Then, the above-described processes may be performed by starting up this program and executing it under the control of an operation system (OS) as with other application programs.

The preferable embodiments according to the present invention have been described above. However, the present invention is not limited to the specific embodiment, and the invention described in Claims and a scope equivalent thereto are included in the present invention.

What is claimed is:

1. An expansion device, comprising:
a housing;
an exhaust fan fixed in the housing;
an installation unit in which a thermally expandable sheet is disposed;
an irradiation unit provided inside the housing and configured to irradiate the thermally expandable sheet with light in a state in which the thermally expandable sheet is placed on the installation unit inside the housing;
an air supply fan attached to the irradiation unit;
a movement unit capable of reciprocating the irradiation unit, to which the air supply fan is attached, between a first position and a second position; and
a control unit configured to perform control of processes comprising:
an expansion process to expand the thermally expandable sheet by irradiating the thermally expandable sheet placed on the installation unit with light by the irradiation unit; and
a cooling process, performed after the expansion process, to cool the thermally expandable sheet by the air supply fan attached to the irradiation unit, while maintaining the state in which the thermally expandable sheet is placed on the installation unit inside the housing, the cooling process including drawing in outside air from outside of the housing and supplying the outside air toward the irradiation unit and into the housing by the air supply fan, and discharging air inside the housing toward the exhaust fan,
wherein the control unit is configured to perform control such that (i) the expansion process is performed when the irradiation unit moves from the first position toward the second position by the movement unit, and (ii) the cooling process is performed when the irradiation unit is returned from the second position to the first position by the movement unit or when the irradiation unit is not moving.

2. The expansion device according to claim 1, wherein the control unit is configured to perform control such that in the expansion process, the irradiation unit irradiates light when being moved from the first position toward the second position by the movement unit, and the air supply fan is stopped when the irradiation unit is moved from the first position toward the second position by the movement unit.

3. The expansion device according to claim 2, wherein the control unit is configured to perform control such that in the cooling process, the irradiation unit does not irradiate light when being returned from the second position to the first position by the movement unit or when the irradiation unit is not moving, and the air supply fan is driven when the irradiation unit is moved from the first position toward the second position by the movement unit.

4. The expansion device according to claim 1, wherein the installation unit is configured to press at least two corners facing each other of the thermally expandable sheet.

5. The expansion device according to claim 1, wherein the installation unit is configured to press at least two sides facing each other of the thermally expandable sheet.

6. The expansion device according to claim 1, wherein the air supply fan cools the irradiation unit by sending the outside air drawn in from outside of the housing toward the irradiation unit.

7. The expansion device according to claim 1, wherein the thermally expandable sheet expands upon being heated to a temperature equal to or higher than a specified temperature, and wherein the control unit is configured to, after performing control of a drying process to dry the thermally expandable sheet by causing the irradiation unit to emit light while moving the irradiation unit by the movement unit so as to maintain the thermally expandable sheet below the specified temperature, perform control of the expansion process to expand the thermally expandable sheet by causing the irradiation unit to emit light while moving the irradiation unit by the movement unit such that the thermally expandable sheet is heated to a temperature equal to or higher than the specified temperature.

8. The expansion device according to claim 7, further comprising a ventilation unit configured to ventilate the inside of the housing, wherein the control unit is configured to perform control of a ventilation process to cause the ventilation unit to ventilate the inside of the housing while moving the irradiation unit by the movement unit after the drying process has been performed and before the expansion process is performed.

9. The expansion device according to claim 8, wherein the ventilation unit ventilates the inside of the housing by sending the air inside the housing in a direction of a return path of the irradiation unit along which the irradiation unit moves after the irradiation unit moves along the thermally expandable sheet in the drying process, and discharging the air to outside of the housing.

10. The expansion device according to claim 8, wherein the control unit is configured to perform control to move the irradiation unit from the first position toward the second position by the movement unit in the drying process, move the irradiation unit from the second position toward the first position by the movement unit in the ventilation process, move the irradiation unit from the first position toward the second position by the movement unit in the expansion process, and move the irradiation unit from the second position toward the first position by the movement unit in the cooling process.

11. The expansion device according to claim 8, wherein the ventilation unit comprises the exhaust fan, the exhaust fan discharging the air inside the housing to outside of the housing.

12. The expansion device according to claim 1, wherein the first position is positioned farther from an opening in the housing into which the thermally expandable sheet is insertable than the second position.

13. The expansion device according to claim 1, further comprising:

a fixing member configured to fix the thermally expandable sheet disposed in the installation unit to the installation unit, wherein the irradiation unit irradiates the thermally expandable sheet with the light in a state in which the thermally expandable sheet is fixed to the installation unit by the fixing member.

14. The expansion device according to claim 13, wherein the cooling process cools the thermally expandable sheet together with the fixing member while maintaining the state in which the thermally expandable sheet is fixed to the installation unit by the fixing member.

* * * * *